(12) United States Patent
Yoon et al.

(10) Patent No.: US 12,383,791 B2
(45) Date of Patent: *Aug. 12, 2025

(54) METHOD FOR EVALUATING ATHLETE, SYSTEM AND DEVICE PERFORMING THE SAME

(71) Applicant: Fitogether Inc., Seoul (KR)

(72) Inventors: Jinsung Yoon, Seoul (KR); Hyunsung Kim, Seoul (KR); Sueyoung Oh, Seoul (KR); Ki-Hyun Kim, Seoul (KR); Sanghyuk Kim, Seoul (KR); Taeryung Kim, Seoul (KR)

(73) Assignee: Fitogether Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,076

(22) Filed: Dec. 11, 2023

(65) Prior Publication Data

US 2024/0100392 A1    Mar. 28, 2024

Related U.S. Application Data

(63) Continuation of application No. 17/135,644, filed on Dec. 28, 2020, now Pat. No. 11,839,794.

(Continued)

(30) Foreign Application Priority Data

Nov. 24, 2020    (KR) .................... 10-2020-0159357

(51) Int. Cl.
*A63B 24/00* (2006.01)
*A63B 71/06* (2006.01)
*G01S 19/19* (2010.01)

(52) U.S. Cl.
CPC ...... *A63B 24/0021* (2013.01); *A63B 24/0062* (2013.01); *A63B 71/0622* (2013.01);
(Continued)

(58) Field of Classification Search
CPC ............ A63B 24/0021; A63B 24/0062; A63B 2024/0025; A63B 2071/0691; G06Q 10/0639

See application file for complete search history.

(56) References Cited

U.S. PATENT DOCUMENTS

2012/0253484 A1    10/2012    Burich et al.

FOREIGN PATENT DOCUMENTS

JP    2014-14683 A    1/2014
KR    10-2009-0118634 A    11/2009
(Continued)

OTHER PUBLICATIONS

Moura, Felipe Arruda et al. (2015). "Analysis of Soccer Players' Positional Variability During the 2012 UEFA European Championship: A Case Study", Journal of human kinetics. vol. 47 225-236. DOI:10.1515/hukin-2015-0078.

*Primary Examiner* — Lawrence S Galka
(74) *Attorney, Agent, or Firm* — BROADVIEW IP LAW, PC

(57) ABSTRACT

Disclosed are an athlete evaluation method and a system and device for performing the same. The athlete evaluation method may include acquiring location data of a plurality of participants, computing a reference location of a specific sport participant on the basis of location data of other sport participants, generating relative location data of the specific participant from the location data of the specific participant in consideration of the reference location, generating heatmap data of the specific participant on the basis of the relative location data, and computing a performance index of the specific participant.

14 Claims, 23 Drawing Sheets

Related U.S. Application Data

(60) Provisional application No. 62/991,983, filed on Mar. 19, 2020.

(52) U.S. Cl.
CPC ....... *G01S 19/19* (2013.01); *A63B 2024/0025* (2013.01); *A63B 2071/0691* (2013.01); *A63B 2220/12* (2013.01); *A63B 2220/807* (2013.01)

(56) References Cited

FOREIGN PATENT DOCUMENTS

| | | |
|---|---|---|
| KR | 10-2018-0063777 A | 6/2018 |
| KR | 10-1906849 B1 | 10/2018 |
| KR | 10-2019-0094954 A | 8/2019 |
| WO | 2009/073610 A2 | 6/2009 |
| WO | 2018/048366 A1 | 3/2018 |

100

1000

2000

△ REFERENCE LOCATION FOR FIRST MATCH
▲ REFERENCE LOCATION FOR SECOND MATCH
○ OBJECT LOCATION FOR FIRST MATCH
● OBJECT LOCATION FOR SECOND MATCH
☆ TARGET ENTITY LOCATION FOR FIRST MATCH
★ TARGET ENTITY LOCATION FOR SECOND MATCH

☆ CORRECTED TARGET ENTITY LOCATION FOR FIRST MATCH
★ CORRECTED TARGET ENTITY LOCATION FOR SECOND MATCH

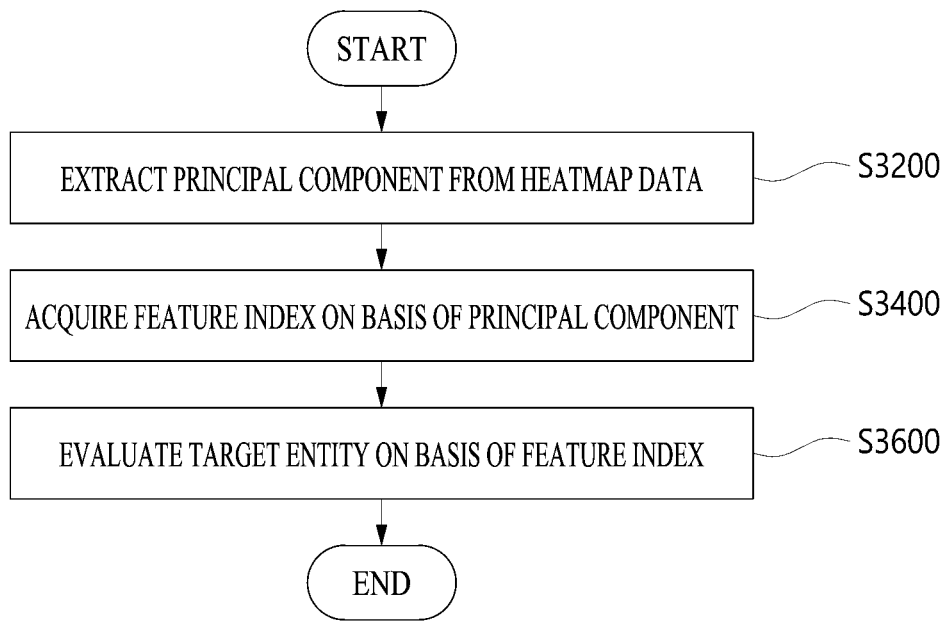
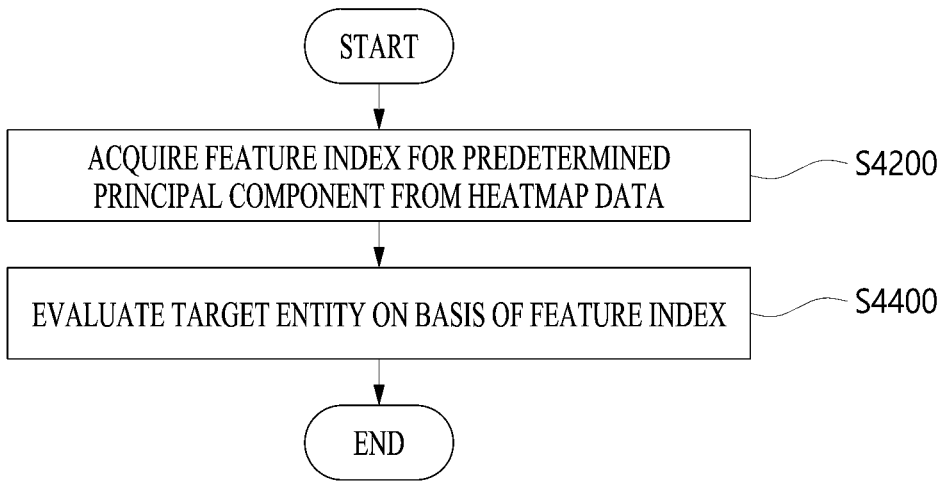

PLURALITY OF HEATMAP
DATASETS LABELED
WITH CHARACTERISTICS

EXTRACT AND STORE
PRINCIPAL COMPONENT FOR
EACH CHARACTERISTIC

ACQUIRE AND STORE
FEATURE INDEX FOR
EACH CHARACTERISTIC

FIG. 26 location-specific principal component

| match \ principal component | 1st | 2nd | 3rd | 4th | 5th | 6th |
|---|---|---|---|---|---|---|
| 1st | f11 | f12 | f13 | f14 | f15 | f16 |
| 2nd | f21 | f22 | f23 | f24 | f25 | f26 |
| 3rd | f31 | f32 | f33 | f34 | f35 | f36 |
| 4th | f41 | f42 | f43 | f44 | f45 | f46 | dynamic principal component

| match \ principal component | 1st | 2nd | 3rd | 4th |
|---|---|---|---|---|
| 1st | f11 | f12 | f13 | f14 |
| 2nd | f21 | f22 | f23 | f24 |
| 3rd | f31 | f32 | f33 | f34 |
| 4th | f41 | f42 | f43 | f44 |

METHOD FOR EVALUATING ATHLETE, SYSTEM AND DEVICE PERFORMING THE SAME

CROSS-REFERENCE TO RELATED APPLICATION

This application is a continuation of U.S. application Ser. No. 17/135,644, filed on Dec. 28, 2020, which claims priority to and the benefit of U.S. Provisional Patent Application No. 62/991,983, filed on Mar. 19, 2020, the disclosure of which is incorporated herein by reference in its entirety. This application claims priority to and the benefit of Korean Patent Application No. 10-2020-0159357, filed on Nov. 24, 2020, the disclosure of which is incorporated herein by reference in its entirety.

BACKGROUND

1. Field of the Invention

The present invention relates to a method of evaluating an athlete and a system for performing the same, and more particularly, to a method of performing athlete evaluation using athlete-related data and an analysis apparatus for performing the same.

2. Discussion of Related Art

Conventionally, in the sport industry, it is common that the evaluation of athletes is subjectively evaluated by a sport evaluation agency. In the case of the conventional athlete evaluation method, an objective evaluation was difficult because criteria for athlete evaluation were ambiguous and not uniform.

Therefore, in the modern sport industry, there is an increasing demand for an Electronic Performance Tracking System ("EPTS") which can objectively evaluate athletes using machines.

However, in the case of the conventional EPTS, only indictors for partial and fragmentary individual athletic abilities are provided for athletes. Therefore, there is a need to evaluate an athlete by comprehensively and consistently analyzing athlete-related data acquired by the EPTS and performing a test on the development of the athlete's ability according to the evaluation result.

SUMMARY OF THE INVENTION

The present invention is directed to providing a method of evaluating an athlete in consideration of a unique feature of an athlete in a corresponding sport in order to promote a more accurate and objective evaluation by reflecting the characteristics of the corresponding sport when evaluating an athlete, and a system and device for performing the same.

The present invention is directed to providing a method of processing location data and at least one piece of dynamic data related to an athlete using data suitable for the evaluation of a corresponding sport in order to increase the accuracy or reliability of the evaluation of the athlete, and a system and device for performing the same.

The present invention is directed to providing a method of acquiring an objective evaluation index of a specific player who plays a sport among a plurality of players who play the corresponding sport, and a system and device for performing the same.

The present invention is directed to providing a method of processing sport data related to a target player to correct the sport data to be appropriate for the evaluation of a specific sport performed by the target player, and a system and device for performing the same.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 18 is a flowchart showing an exemplary method of a data analysis device analyzing data using corrected heatmap data;

FIG. 19 is a flowchart showing another example of a method of a data analysis device analyzing data using corrected heatmap data;

FIG. 26 shows an example of an acquired feature index according to an embodiment;

DETAILED DESCRIPTION OF EXEMPLARY EMBODIMENTS

Figure 1:
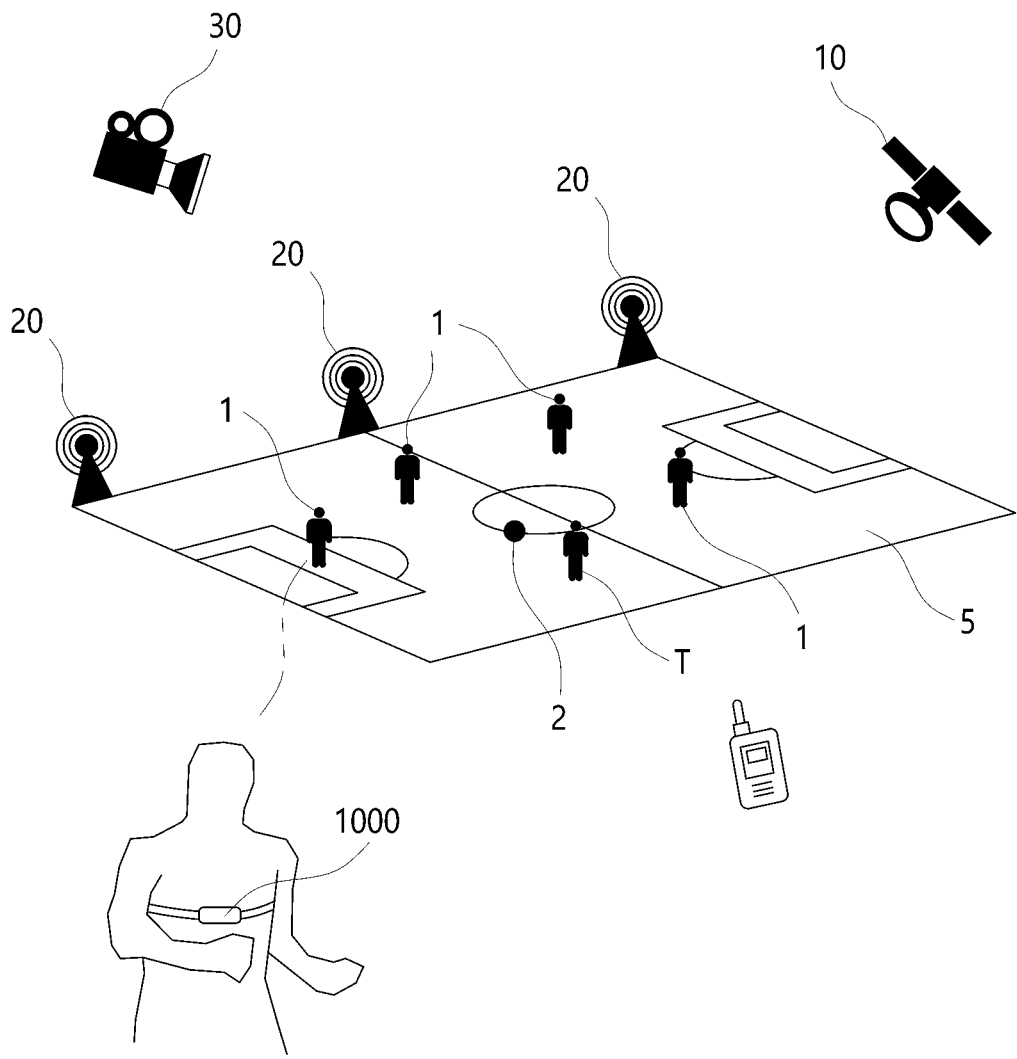
FIG. 1 schematically shows an example of an analysis system according to an embodiment.

The above objects, features, and advantages of the present invention will become more apparent from the following detailed description taken in conjunction with the accompanying drawings. However, since the present invention may be variously modified and have several exemplary embodiments, specific exemplary embodiments will be shown in the accompanying drawings and described in detail.

In the figures, the thickness of layers and regions is exaggerated for clarity. Also, when it is mentioned that an element or layer is "on" another element or layer, the element or layer may be formed directly on the other element or layer, or a third element or layer may be interposed therebetween. Like reference numerals refer to like elements throughout the specification. Further, like reference numerals will be used to designate like elements within the same scope shown in the drawings of the embodiments.

Detailed descriptions about well-known functions or configurations associated with the present invention will be omitted in order not to unnecessarily obscure the subject matter of the present invention. Also, ordinal numbers (e.g., first, second, etc.) used in the following description are merely identification symbols for distinguishing one element form another element.

The suffixes "module" and "unit" for elements used in the following description are given or used interchangeably only for the ease of writing this specification, and thus do not themselves have distinct meanings or roles.

The present disclosure relates to a method for evaluating a target entity by analyzing data acquired from at least one or more sport objects, and a system for performing the same.

Here, a sport may be interpreted in various ways as all sports having a target capable of acquiring data and an object capable of analyzing and evaluating the acquired data. That is, the term "sport" used herein refers to a comprehensive concept of sports, which includes, for example, individual sports and team sports, ball sports and non-ball sports, sports with sport instruments and sports without sport instruments, and professional sports and amateur sports. However, for convenience of description, the following description will focus on soccer, but the spirit of the present disclosure is not limited to soccer.

In the following drawings, an analysis system according to an embodiment will be schematically described, and terms to be used in the following description of the present disclosure will be summarized with reference to the drawings. However, it is to be understood that the terms used herein are for convenience of description and the spirit of the present disclosure is not limited by these terms.

FIG. 1 schematically shows an example of an analysis system according to an embodiment.

Referring to FIG. 1, an evaluation system according to an embodiment may acquire data related to a sport object, analyze the acquired data, and evaluate a target entity.

Here, the term "sport object" may refer to any object that is associated with a sport and that can be an object of data acquisition related to the corresponding sport. That is, the sport object may be a player 1 who plays the corresponding sport and may include specific objects used in the corresponding sport. For example, the sport object may include a ball 2, a goalpost 3, or a line drawn on a pitch G.

Also, the term "target entity" may refer to an object that is associated with a corresponding sport and that be analyzed and evaluated by using data acquired from a sport object. Here, the target entity may or may not be included in the sport object. That is, the analysis method according to an embodiment may acquire data from at least one sport object including the target entity and evaluate the target entity or may acquire data from at least one sport object excluding the target entity and evaluate the target entity.

As an example, the target entity may indicate a player 1 who plays the corresponding sport. Here, the player 1, who is subject to evaluation through the system 100 according to an embodiment, is referred to as a "target player T."

Also, the target entity may be a combination of multiple players 1 who play the corresponding sport. For example, the target entity may indicate a plurality of players 1 in the same position or may indicate a plurality of players 1 assigned the same mission.

Also, the target entity may be a team that plays the corresponding sport. Here, the target entity may refer to some or all of the team that plays the corresponding sport. For example, the target entity may be classified for each tactic of the team. More specifically, the target entity may be classified for each role such as an offense group, a defense group, and a midfielder group.

Referring to FIG. 1 again, the acquisition of sport data according to an embodiment may be implemented through an EPTS.

Here, the EPTS may be implemented in a form in which a data acquisition device 1000 is installed in a sport object. For example, the EPTS may acquire sport object-related data on the basis of GPS 10 data of the sport object. As another example, the EPTS may acquire sport object-related data on the basis of short-range communication (ultra-wideband (UWB)). As another example, the EPTS may be implemented based on an inertial measurement unit (IMU) sensor such as accelerometers and gyrometers. The data acquisition device 1000 installed in the sport object may be generally implemented in the form of a wearable device but is not limited thereto.

Also, the EPTS may be implemented based on image data. For example, the EPTS may acquire data related to a sport object using image data captured by a camera 30 installed in a stadium.

Also, herein, the sport object-related data acquired through the data acquisition device 1000 is referred to as "sport data." The sport data may include location data and dynamic data, which will be described in detail below.

Figure 2:
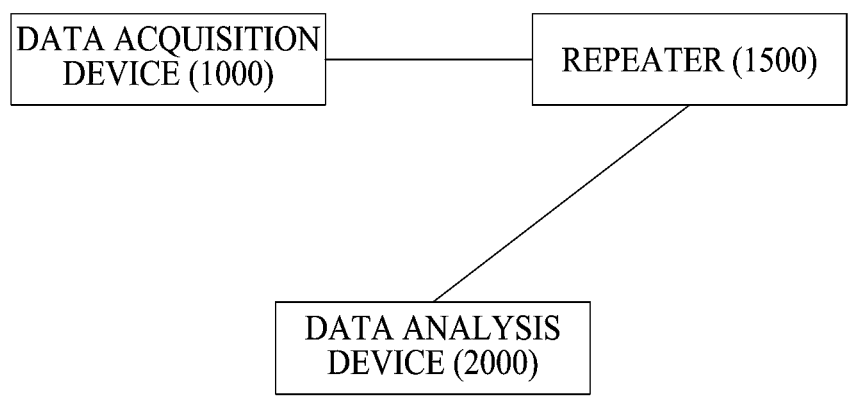
FIG. 2 is a block diagram schematically showing an analysis system 100 according to an embodiment.

FIG. 2 is a block diagram schematically showing an analysis system 100 according to an embodiment.

Referring to FIG. 2, the system 100 according to an embodiment may include a data acquisition device 1000 and a data analysis device 2000.

According to an embodiment, the data acquisition device 1000 may transmit acquired sport data to the data analysis device 2000. The data acquisition device 1000 may directly transmit at least one piece of sport data to the data analysis device 2000. Alternatively, the data acquisition device 1000 may transmit at least one piece of sport data to a repeater 1500 first. When at least one piece of sport data is received, the repeater 1500 may transmit the received sport data to the data analysis device 2000 collectively or separately.

Also, the data acquisition device 1000 may directly transmit the sport data to the data analysis device 2000 or may pre-process the sport data before the transmission. Alternatively, the pre-processing of the sport data may be performed by the repeater 1500.

The data analysis device 2000 may analyze the sport data received from the data acquisition device 1000 or the repeater 1500 to evaluate the target entity. Also, the data analysis device 2000 may be implemented as a server that is connected to the data acquisition device 1000 over a network. Herein, the following description will focus on the data analysis device 2000 implemented as a device. However, this is only for convenience of description, and it will be understood that the data analysis device 2000 may be implemented as a server that performs the same function as described above. Also, a specific method performed by the data analysis device 2000 will be described in detail below.

The elements of the analysis system 100 will be described in detail below with reference to the drawings.

Figure 3:
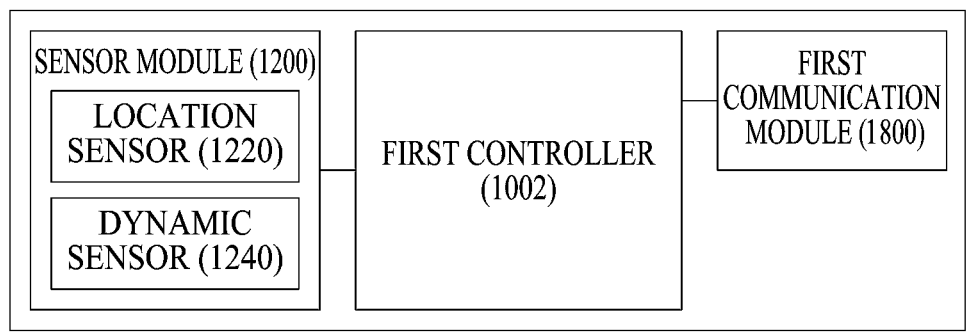
FIG. 3 is a block diagram of a data acquisition device according to an embodiment.

FIG. 3 is a block diagram of a data acquisition device according to an embodiment.

Referring to FIG. 3, a data acquisition device 1000 according to an embodiment may include at least one sensor module 1200, a first communication module 1800, and a first controller 1002.

According to an embodiment, the first controller 1002 may acquire sport data regarding an athlete through a sensor module 1200 and may transmit the sport data acquired through the first communication module 1800 to the data analysis device 2000.

The elements of the data acquisition device 1000 according to an embodiment will be described below.

According to an embodiment, the sensor module 1200 may include a location sensor 1220 and/or a dynamic sensor 1240.

Here, the location sensor 1220 may measure location data of a sport object. Specifically, the location sensor 1220 may measure the location data of the sport object and transmit the measured location data to the first controller 1002. Here, the location sensor 1220 may be implemented in various forms. As an example, the location sensor 1220 may be implemented as a Global Navigation Satellite System (GNSS) antenna to detect a GNSS signal of the player 1. As another example, the location sensor 1220 may be implemented as a UWB receiving module to detect a UWB signal of the player 1.

Here, the dynamic sensor 1240 may measure dynamic data of the sport object. Specifically, the dynamic sensor 1240 may measure the dynamic data of the sport object and transmit the measured dynamic data to the first controller 1002. Here, the dynamic data may be data related to the movement of the sport object such as the velocity, acceleration, and jerk of the sport object. As an example, the dynamic sensor 1240 is implemented as an accelerometer to measure the acceleration of the player 1. As another example, the dynamic sensor 1240 may be implemented as a gyrometer. As another example, the dynamic sensor 1240 may be implemented as a magnetometer.

The first communication module 1800 according to an embodiment may perform communication with an external device or an external server. The data acquisition device 1000 may perform data communication with the repeater 1200 or the data analysis device 2000 through the first communication module 1800. For example, the data acquisition device 1000 may use the first communication module 1800 to transmit the location data and/or the dynamic data of the athlete to the data analysis device 2000 or the external device. Here, the data acquisition device 1000 may transmit the sport data in real time or after a preset time has elapsed. Also, the data acquisition device 1000 may transmit the sport data of at least one sport object individually or collectively.

Also, the first controller 1002 may acquire the dynamic data of the athlete measured through the dynamic sensor 1240 and may transmit the dynamic data acquired to the data analysis device 2000 through the first communication module 1800.

Also, the first controller 1002 may acquire the location data of the athlete measured through the location sensor 1220, process the acquired location data, and generate dynamic data.

The first controller 1002 may control the overall operation of the data acquisition device 1000. For example, the first controller 1002 may generate a control signal to receive the location data from the location sensor 1220 and then transmit the location data to the data analysis device 2000 through the first communication module 1800. As another example, the first controller 1002 may generate a control signal to receive the dynamic data from the dynamic sensor 1240 and transmit the dynamic data to the data analysis device 2000 through the first communication module 1800.

Also, the first controller 1002 may generate additional data on the basis of the sport data acquired from the sensor module 1200. Specifically, the first controller 1002 may generate the dynamic data using the location data transmitted from the location sensor 1220. Also, the first controller 1002 may generate new dynamic data using the dynamic data received from the dynamic sensor 1240. As a specific example, the first controller 1002 may generate velocity data by differentiating location data acquired at a plurality of time points over time.

Also, the first controller 1002 may transform the format of the location data or the dynamic data received from the location sensor 1220 or the dynamic sensor 1240.

The first controller 1002 may be implemented as a central processing unit (CPU) or a device similar to the CPU according to hardware, software, or a combination thereof. The first controller 1002 may be provided in a hardware form of an electronic circuit for processing an electrical signal to perform a control function. The first controller 1002 may be provided in a software form of a program or a code for driving a hardware circuit.

The data acquisition device 1000 may have a separate power supply unit or receive power from the outside in a wired or wireless manner and may a switch for controlling the power supply unit.

Figure 4:
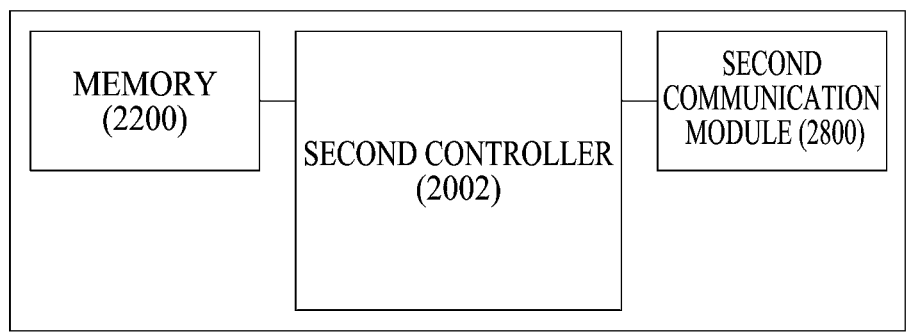
FIG. 4 is a block diagram of a data analysis device according to an embodiment.

FIG. 4 is a block diagram of a data analysis device according to an embodiment.

Referring to FIG. 4, a data analysis device 2000 may include a second controller 2002, a memory 2200, and a second communication module 2800.

According to an embodiment, the second controller 2002 may acquire location data and/or dynamic data of an athlete from the data acquisition device 1000 through the second communication module 2800, analyze the location data and/or the dynamic data using an analysis program stored in the memory 2200, and evaluate the athlete. Here, the data analysis device 2000 may acquire sport data from the data acquisition device 1000 in real time and evaluate the athlete in real time.

The elements of the data analysis device 2000 according to an embodiment will be described below.

The memory 2200 may store various kinds of information of the data analysis device 2000. Examples of the memory 2200 include a hard disk drive (HDD), a solid state drive (SSD), a flash memory, a read-only memory (ROM), a random access memory (RAM), and the like.

Various kinds of data necessary for the operation of the data analysis device 2000 may be stored in the memory 2200 in addition to an operating system for driving the data analysis device 2000 or a program for operating the elements of the data analysis device 2000. For example, a program for processing the location data and/or the dynamic data of the athlete and a machine learning algorithm for analyzing the location data and/or the dynamic data may be stored in the memory 2200.

The second communication module 2800 may perform communication with an external device or an external server. The data analysis device 2000 may use the second communication module 2800 to perform data communication with the data acquisition device 1000 or an external server. For example, the data analysis device 2000 may use the second communication module 2800 to acquire data necessary to evaluate an athlete from the data acquisition device 1000.

The second controller 2002 may be implemented as a central processing unit (CPU) or a device similar to the CPU according to hardware, software, or a combination thereof. The second controller 2002 may be provided in a hardware form of an electronic circuit for processing an electrical signal to perform a control function. The second controller 2002 may be provided in a software form of a program or a code for driving a hardware circuit.

The second controller 2002 may control the overall operation of the data analysis device 2000. For example, the second controller 2002 may load a program for processing and analyzing data from the memory 2200 and process and analyze data acquired from the data acquisition device 1000 and may generate a control signal to provide a result of the processing and analysis to an external device or an external server through the second communication module 2800. The sport data analysis method performed by the data analysis device 2000 will be described in detail below.

Also, the data analysis device 2000 may further include a separate output unit for outputting a data analysis result. Here, the second controller 2002 may process and analyze the data acquired from the data acquisition device 1000 and generate a control signal for providing a result of the processing and analysis through the output unit.

Also, the second controller 2002 may generate additional data on the basis of the data acquired from the data acquisition device 1000. Specifically, the second controller 2002 may acquire dynamic data on the basis of the location data of the athlete acquired from the data acquisition device 1000 through the second communication module 2800. As a more specific example, the second controller 2002 may acquire velocity data of the athlete by differentiating time-dependent location data of the athlete acquired from the data acquisition device 1000.

The elements of the analysis system 100 according to an embodiment have been described above. A target entity analysis method implemented in the analysis system 100 according to an embodiment will be described below with reference to the drawing.

Figure 5:
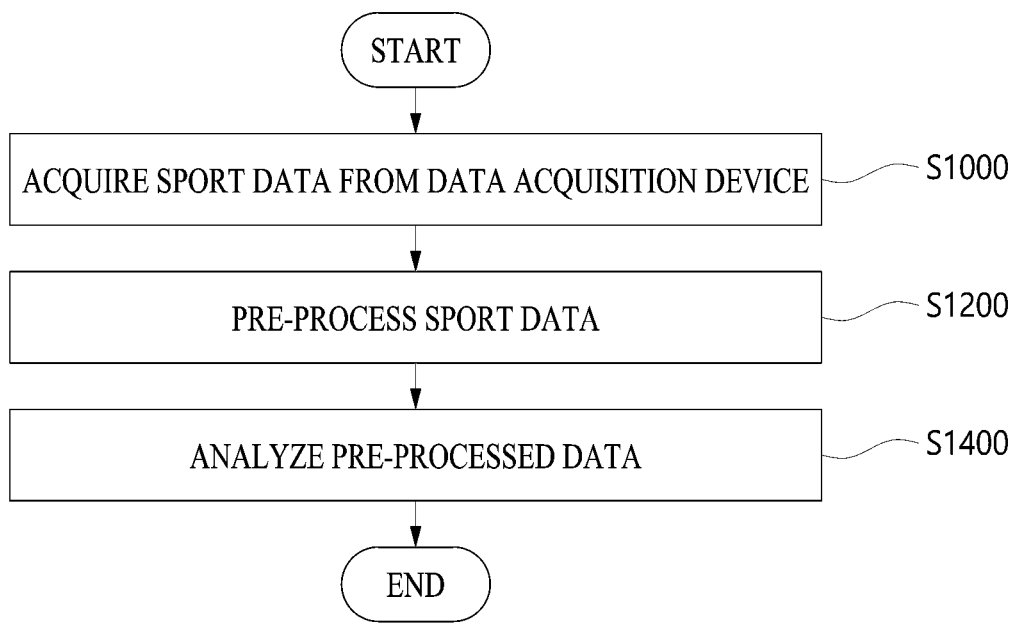
FIG. 5 is a flowchart of a data analysis method that is performed by a data analysis device according to an embodiment.

FIG. 5 is a flowchart of a data analysis method that is performed by a data analysis device according to an embodiment.

Referring to FIG. 5, the sport data analysis method according to an embodiment may include acquiring data from a sport object (S1000), pre-processing the acquired data (S1200), and analyzing the pre-processed data (S1400).

First, in the data acquisition step S1000, the system 100 may acquire sport data. In detail, the data acquisition device 1000 may acquire sport data from a sport object and transmit the acquired sport data to the data analysis device 2000. The detailed operation of acquiring the sport data from the data acquisition device 1000 has been described above.

In the step of pre-processing the acquired data (S1200), the system 100 may pre-process the sport data. Specifically, the data analysis device 2000 may pre-process the sport data received from the data acquisition device 1000. In detail, the second controller 2002 may pre-process the sport data acquired by the data acquisition device 1000 as input data of an analysis algorithm. More specifically, the second controller 2002 may generate heatmap data for the sport data and process the generated heatmap data as input data of the analysis algorithm. Here, the pre-processing of the sport data may be performed to reduce the influence of match-specific internal and external factors on the sport object-related data or may be performed to extract data that is meaningful in the analysis algorithm. The operation of pre-processing the acquired data (S1200) will be described in detail below.

After the data pre-processing step S1200, the system 100 may analyze the pre-processed sport data (S1400). Specifically, the second controller 2002 of the data analysis device 2000 inputs the pre-processed sport data to the analysis algorithm and evaluates the target entity on the basis of an output result of the analysis algorithm. The evaluation of the analysis algorithm and the target entity performed in the data analysis step S1400 will be described in detail below.

The sport data analysis method performed by the system 100 according to an embodiment has been outlined above.

The sport data pre-processing performed by the data analysis device 2000 has been described in detail below with reference to FIGS. 6 to 16.

Figure 6:
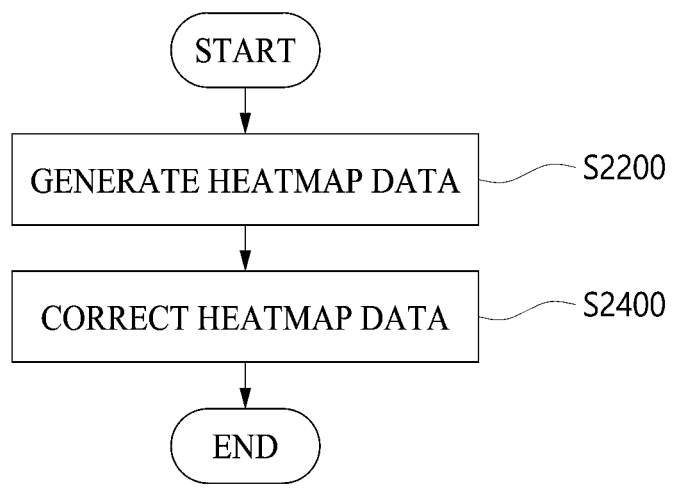
FIG. 6 is a flowchart showing a method of a data analysis device pre-processing sport data according to an embodiment.

FIG. 6 is a flowchart showing a method of a data analysis device pre-processing sports data according to an embodiment.

Referring to FIG. 6, the sport data pre-processing method performed by the data analysis device according to an embodiment may include generating heatmap data (S2200) and correcting heatmap data (S2400).

First, in the step of generating the heatmap data (S2200), the data analysis device 2000 may generate heatmap data for the sport data. Here, the heatmap data may refer to data representing a frequency distribution of the sport data for a predetermined time. In other words, the heatmap data may refer to a set of sport data during a predetermined time. Also, a simple visualization of heatmap data may be expressed as a "heatmap", and these terms may be used interchangeably.

Here, the predetermined time may be variously set. As an example, the predetermined time may be at least a portion of the total time of the sport match.

Specifically, the predetermined time may be a total play time for which an athlete plays the corresponding sport. Specifically, the predetermined time may be a play time for which an athlete plays the corresponding sport while performing a specific position. Also, the predetermined time may be a time for which an athlete plays the corresponding sport while performing a specific role. This will be described in detail later.

Also, according to an embodiment, sport heatmap data may include "location heatmap data" and "dynamic heatmap data."

Here, the term "location heatmap data" may refer to a frequency distribution of data on locations that the player 1 occupies in a stadium for a predetermined time. Here, the location heatmap data may include a plurality of cells, and the cells may correspond to a stadium where the player 1 plays the sport.

Also, the term "dynamic heatmap data" may refer to a frequency distribution of dynamic data on the movement of the player 1 for a predetermined time. As an example, velocity heatmap data may be formed in a matrix with two dimensions, which may indicate a velocity vector in an offense/defense direction of the stadium and a velocity vector in a direction orthogonal to the offense/defense direction. As another example, acceleration heatmap data may also be formed in a matrix with two dimensions, which may indicate an acceleration vector in the offense/defense direction of the stadium and a velocity vector in a direction orthogonal to the offense/defense direction.

After the heatmap data generation step S2200, the data analysis device 2000 may correct the generated heatmap data (S2400).

In the heatmap data correction step S2400, the data analysis device 2000 may correct the heatmap data so as to reduce the influence of match-specific internal and external factors related to the sport object and improve the accuracy of the analysis algorithm. The heatmap data correction method will be described in detail below.

Also, according to an embodiment, the data analysis device 2000 may perform labeling with the athlete's characteristics when generating the heatmap data.

Figure 7:
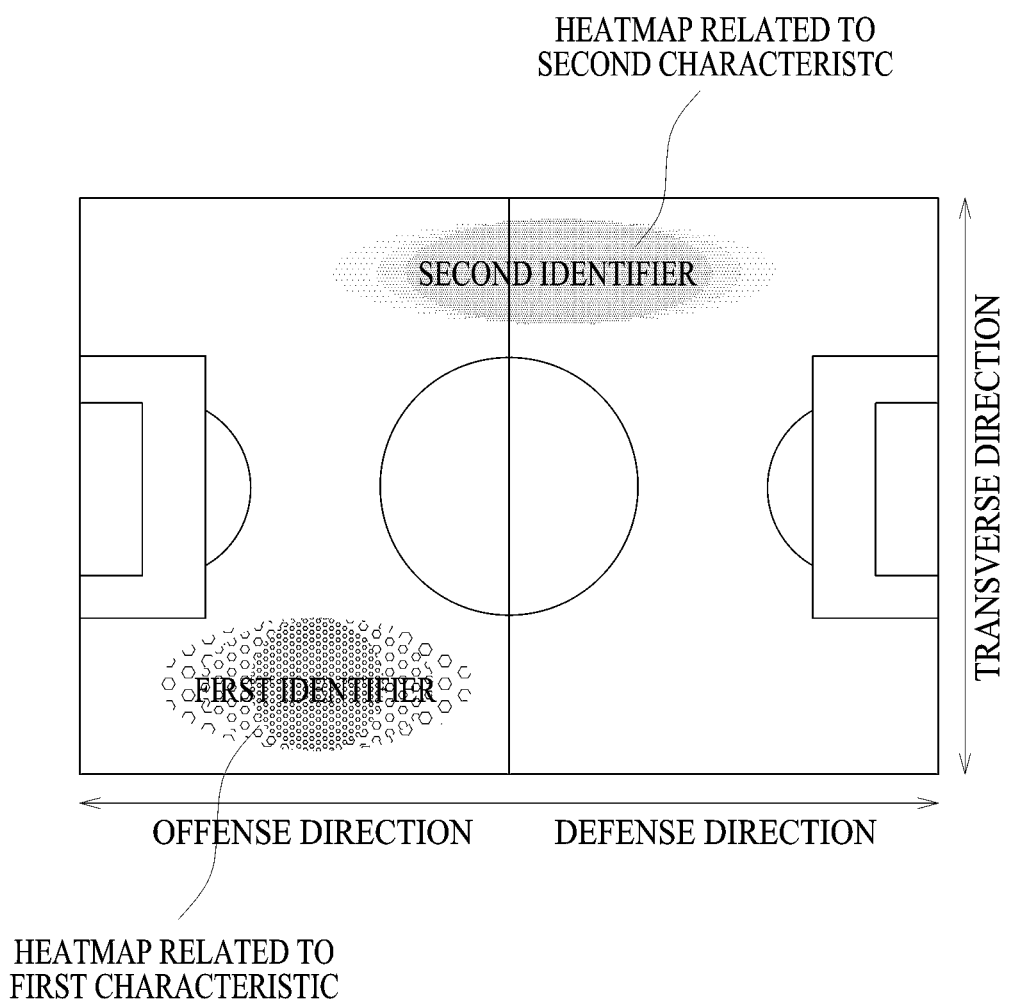
FIG. 7 shows an example of heatmap data labeled with the characteristics of a sport object according to an embodiment.

FIG. 7 shows an example of heatmap data labeled with the characteristics of a sports object according to an embodiment.

Referring to FIG. 7, the data analysis device 2000 may generate sport heatmap data labeled with the characteristics of the sport object. Specifically, the second controller 2002 may generate sport heatmap data, analyze the generated sport heatmap data, determine the characteristics of an athlete, and perform labeling with the determined characteristics of the athlete. Here, the sport data may be labeled with the characteristics of the athlete and transmitted to the data analysis device 2000 by the data acquisition device 1000. In this case, the second controller 2002 may label the generated sport heatmap data with the characteristics of the athlete received from the data acquisition device 1000. Also, here, the determining of the characteristics of the athlete may be omitted. Here, the labeling may be implemented by adding an identifier reflecting the player's characteristics to the heatmap data.

Also, the characteristics of the sport object including the player may refer to all properties related to the sport or related to the sport object. For example, the characteristics of the sport object may be tactical characteristics in a sport match. For example, the characteristics of the sport object may include a position played by the sport object, a role performed in a match by the sport object, and the like. Also, the characteristics of the sport object may be individual characteristics of an athlete. For example, the characteristics of the sport object may include the athlete's age, gender, and the like. Also, the characteristics of the sport object may include a sport level. For example, the characteristics of the sport object may include the level of a league in which the sport object plays, the level of a competition in which the sport object has participated, whether it is a friendly match, and the like. Also, player characteristic information may be prestored in the memory 2200.

An example will be described with reference to FIG. 7.

FIG. 7 shows heatmap data reflecting the characteristics of the same player. Specifically, location heatmap data reflecting a first characteristic and location heatmap data reflecting a second characteristic are shown.

Here, as an example, the first characteristic may refer to a first position performed by the player. Also, as an example, the second characteristic may refer to a second position different from the first position performed by the player. In detail, the location heatmap shown in FIG. 7 may represent location data regarding the first position performed by the player in the match for a specific time and location data regarding the second position performed for another specific time. Also, here, the location heatmap related to the first position may be labeled with a first identifier, and the location heatmap related to the second position may be labeled with a second identifier. Here, the first identifier and the second identifier may include information regarding the first position and information regarding the second information, respectively.

A heatmap data correction method performed by the data analysis device will be described in detail below with reference to the drawing.

First, the correction of the location heatmap data performed by the data analysis device 2000 will be described with reference to FIGS. 8 to 12. Then, the correction of the dynamic heatmap data performed by the data analysis device 2000 will be described with reference to FIGS. 13 to 17.

Figure 8:
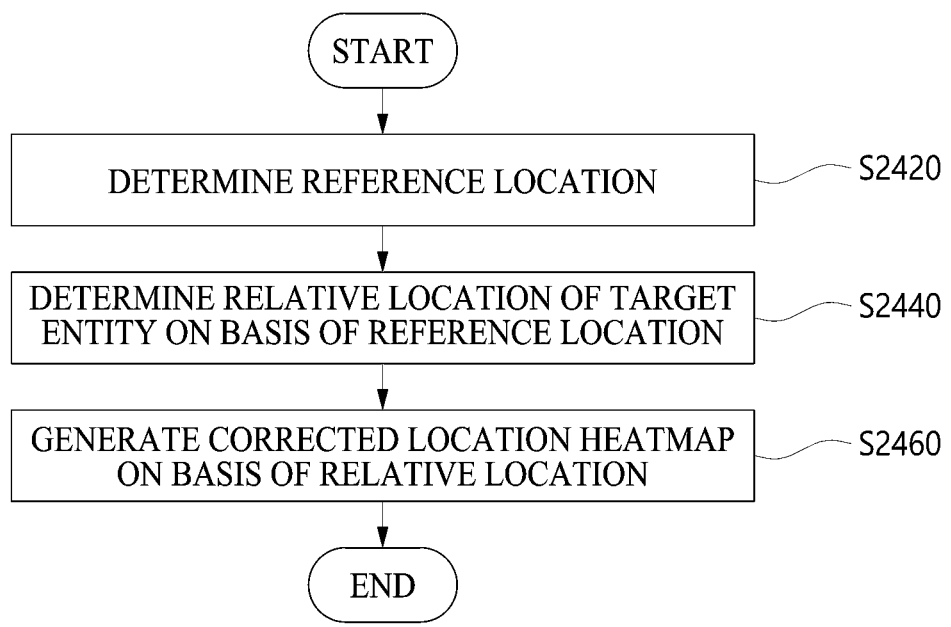
FIG. 8 shows a location heatmap data correction method performed by a data analysis device according to an embodiment.

FIG. 8 shows a location heatmap data correction method performed by a data analysis device according to an embodiment.

Referring to FIG. 8, the method of correcting the location heatmap data may include determining a reference location on the basis of location data of a sport object (S2420), determining a relative location of a target entity on the basis of the reference location (S2440), and generating a corrected location heatmap on the basis of the relative location (S2460).

In the step of determining the reference location (S2420), first, the data analysis device 2000 may determine the reference location on the basis of the location data of the sport object. Specifically, the second controller 2002 may acquire reference location data, which is a reference for correcting location data of the target entity, on the basis of location data of at least one sport object. Here, the determining of the reference location will be described in detail below.

In the step of determining the relative location of the target entity (S2440) after the reference location determination step S2420, the data analysis device 2000 may determine the relative location of the target entity on the basis of the reference location. Specifically, the second controller 2002 may determine the relative location of the target entity using the location data of the target entity and the reference location derived from at least one sport object. Here, the relative location of the target entity may vary depending on the predetermined reference location. Here, the method of determining the relative location will be described in detail below.

When the relative location of the target entity is determined, the data analysis device 2000 may generate corrected heatmap data (S2460). Specifically, the second controller 2002 may generate corrected location heatmap data on the basis of the relative location of the target entity.

An example of the location heatmap data generated by the data analysis device 2000 according to an embodiment will be described first below with reference to FIG. 9, and a method in which the location heatmap data is corrected by the data analysis device 2000 shown in FIG. 8 will be described with reference to FIGS. 9 to 12.

Figure 9:
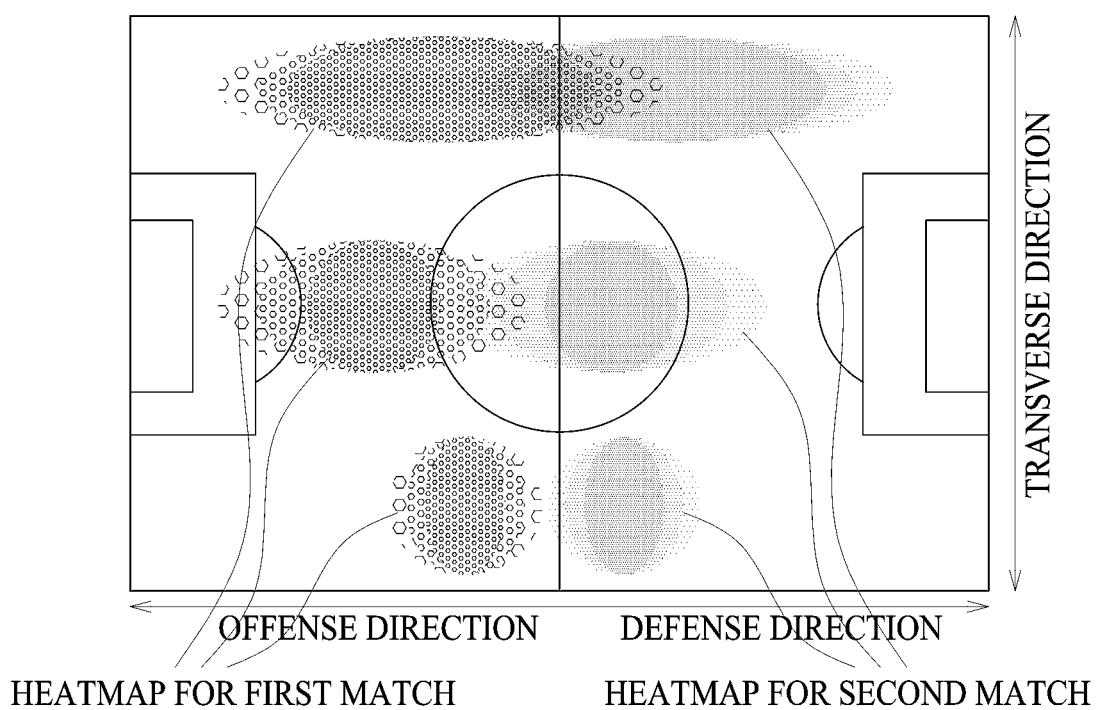
FIG. 9 shows an example of an uncorrected location heatmap in two different matches for an athlete according to an embodiment.

FIG. 9 shows an example of an uncorrected location heatmap in two different matches for an athlete according to an embodiment.

Referring to FIG. 9, location heatmap data for one athlete playing two different matches is visualized. FIG. 9 shows that the athlete mainly occupies the right side of a stadium with respect to the offense direction while playing each of the sport matches. Also, a location occupancy frequency is visualized to be high on the right side, where the athlete has a high location occupancy frequency on a pitch during the match, and a location occupation frequency is visualized to be low on the left side, where the athlete has a low location occupancy frequency. Also, a location occupancy frequency is visualized to be medium in a pitch center region having a lower location occupancy frequency than the right side and having a higher location occupancy frequency than the left side.

In the following description, for convenience of description, the length direction of the stadium may be referred to as an offense/defense direction, and the width direction of the stadium may be referred to as a transverse direction. It will be understood that these terms may be used interchangeably.

As shown, the location heatmap data may indicate the total location occupancy frequency of the sport object during each match but may not reflect information regarding match-specific internal and external factors.

For example, as shown in FIG. 8, when an athlete or a team to which an athlete belongs uses a tactic with a defense tendency, the location heatmap data of the athlete may be biased toward the defense direction. As another example, when an athlete or a team to which an athlete belongs uses a tactic with an offense tendency, the location heatmap data of the athlete may be biased toward the offense direction. In addition, for various reasons, the location heatmap data of the athlete may not reflect the match-specific internal and external factors.

As an example, when the form of the athlete's location heatmap data changes according to the team's tactical tendency, the location heatmap data does not fully reflect the athlete's personal tendencies. Thus, the accuracy of the evaluation of the athlete based on the location heatmap data may be decreased.

Accordingly, in order to improve the accuracy of the evaluation of the athlete based on the location heatmap data, there is a need to pre-process the location data by reflecting information on sport match-related internal and external factors.

Figure 10:
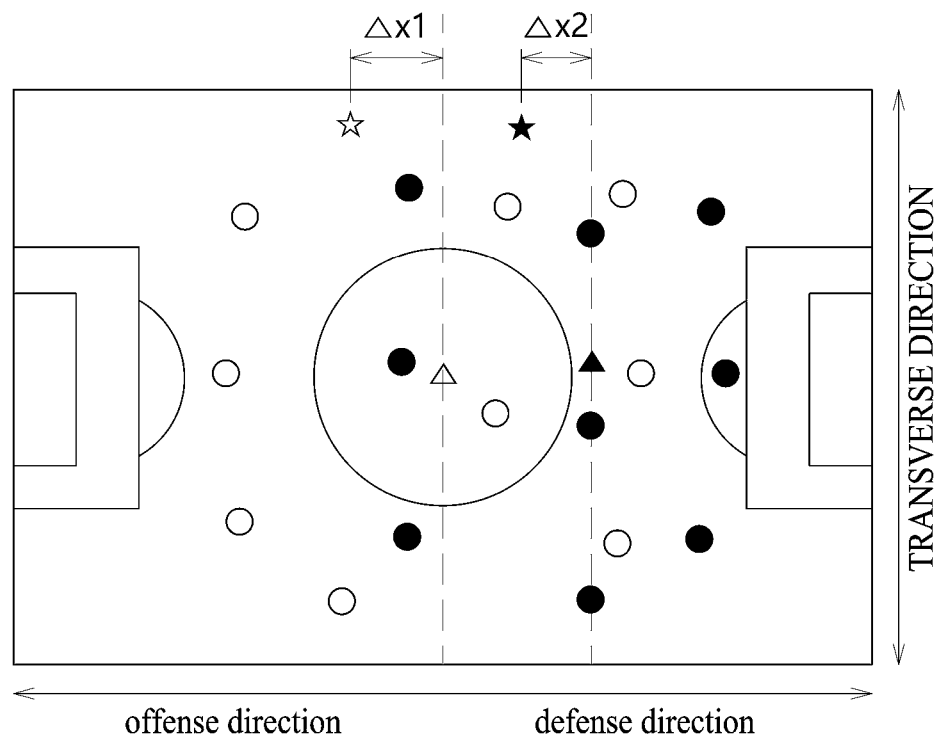
FIG. 10 shows an example of reference location data and specific-time-point location data in two different matches for an athlete according to an embodiment.
Figure 11:
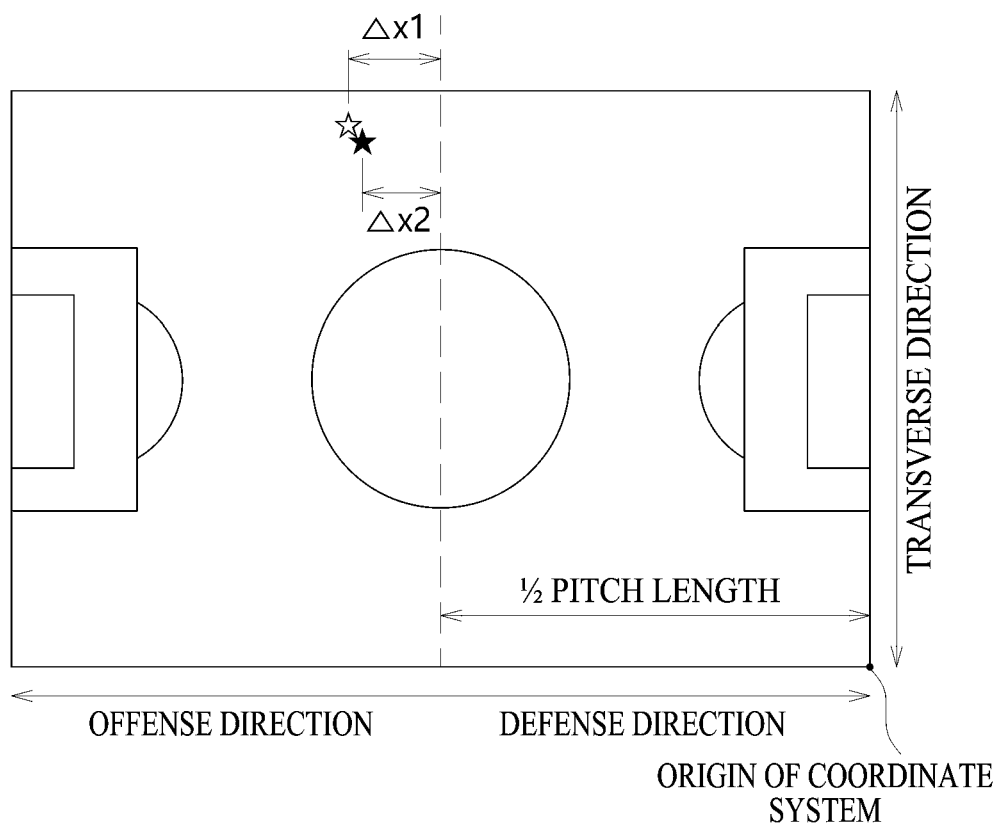
FIG. 11 shows corrected specific-time-point location data in two different matches for an athlete according to an embodiment.
Figure 12:
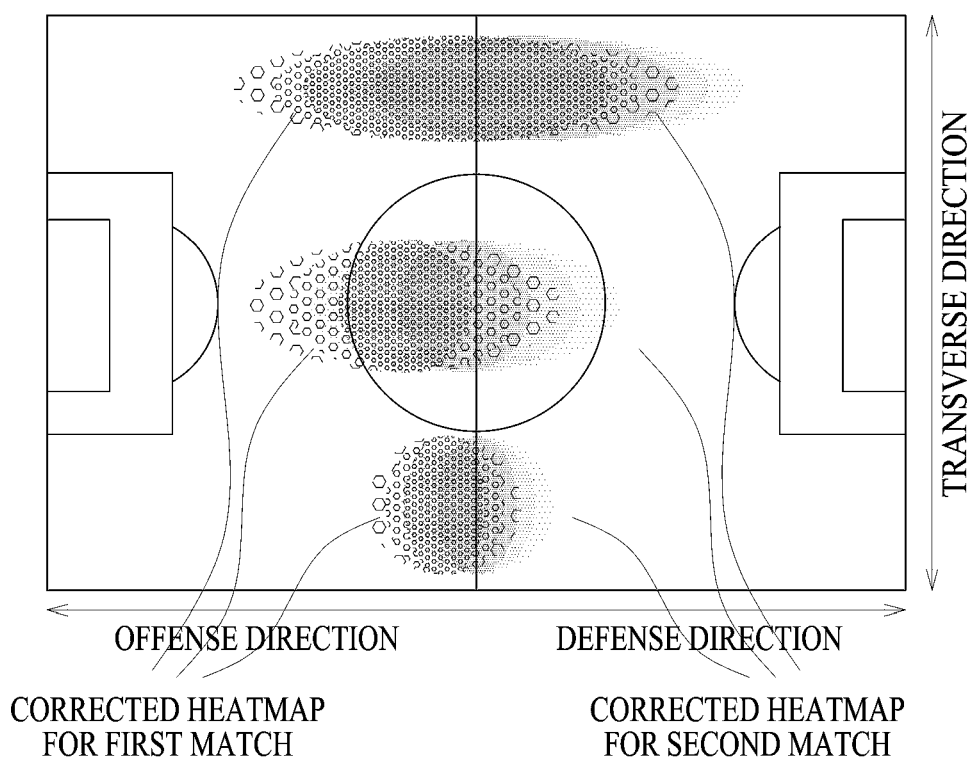
FIG. 12 shows relative location heatmap data obtained by correcting location heatmap data of FIG. 8 according to an embodiment.

FIGS. 10 to 12 show a method of the data analysis device generating corrected location heatmap data according to an embodiment.

FIG. 10 shows an example of reference location data and specific-time-point location data in two different matches for an athlete according to an embodiment.

Referring to FIG. 10, the data analysis device 2000 may determine the reference location data in order to correct location heatmap data. Specifically, the second controller 2002 may determine the reference location data on the basis of location data of at least one sport object.

Here, the reference location data may be variously set to attenuate the match-specific internal factors. As an example, the reference location data may be determined based on the location data of the at least one sport object. As a specific example, the reference location data may be an average location of at least two players of a team including a target player. As another specific example, the reference location data may be an average location of all players of the team. Also, the reference location data may be an average location of some players of the team. Here, the target player may or may not be included in calculating the average location.

As another example, the reference location data may be location data of a specific sport object. In detail, the reference location data may be location data of a ball. As another example, the reference location data may be location data of at least one referee.

In more detail with reference to the drawings, FIG. 10 shows location data of all athletes of the team including the target player. First, location data for a first match shows that the team including the target player has location data biased to defense. Also, location data for a second match shows that the team including the target player has location data biased to offense.

In the first match, an average location of all players of a team including a target player is shown. In this case, the distance in the offense/defense direction between the average location and the location of the target player in the first match may be expressed as ΔX1. Here, the average location was used as reference location data for correcting location heatmap data of the first match.

Also, in the second match, an average location of all players of a team including a target player is shown. In this case, the distance in the offense/defense direction between the average location and the location of the target player in the second match may be expressed as ΔX2. Here, the average location was used as reference location data for correcting location heatmap data of the second match.

The method of determining reference location data has been described above. A method of the data analysis device 2000 acquiring corrected location data using reference location data and/or original location data will be described below.

FIG. 11 shows corrected specific-time-point location data in two different matches of an athlete according to an embodiment.

Referring to FIG. 11, the second controller 2002 may generate corrected location data on the basis of acquired reference location data. Specifically, the second controller 2002 may generate corrected location data on the basis of data obtained by combining the reference location data and location data of a target player. The corrected location data is hereinafter referred to as "relative location data." Also, heatmap data generated based on relative location data is hereinafter referred to as "relative location heatmap data."

Here, there may be various methods of combining the reference location data and the location data of the target player. As an example, the combined location data may be location data generated based on a value obtained by arithmetically applying a coordinate value of the location data of the target layer to a coordinate value of the reference location data.

Also, here, when the reference location data and the location data of the target player are combined, some or all of the location data may be used. For example, as shown in FIGS. 10 and 11, the second controller 2002 may generate the relative location data using only an offense/defense direction coordinate value of the location data. More specifically, the second controller 2002 may generate the relative location data using ΔX1, which is the difference between offense/defense direction coordinate values of the reference location data and the location data of the target player, in the case of the first match and may generate the relative location data using ΔX2, which is found in a similar way, in the case of the second match.

Also, here, the second controller 2002 may generate corrected location data on the basis of a predetermined value. Specifically, the second controller 2002 may generate the relative location data by arithmetically applying a predetermined value to the location data of the target player or data obtained by combining the location data of the target player and the reference location data. The predetermined value may be stored in the memory 2200. Here, the predetermined value may be variously set. As an example, the predetermined value may be at least a portion of an offense/defense direction length value of a pitch in which an athlete has played. As another example, the predetermined value may be at least a portion of a transverse direction length value of a pitch in which an athlete has played.

That is, according to an embodiment of the present disclosure, the second controller 2002 may generate relative location data on the basis of data obtained by combining the reference location data and the location data of the target entity, generate the relative location data on the basis of a predetermined value, or generate the relative location data by combining the above two schemes.

A detailed example will be described below with reference to the drawing.

For the relative location of the target player of the first match which is generated by the second controller 2002, a coordinate obtained by adding a predetermined proportion of the total length of the pitch in the offense/defense direction to the distance ΔX1 in the offense/defense direction between the average location 8' and the location 7' of the target player in the first match may be computed as a corrected location 9 of the target player in the first match. Here, among the location data of the target player, the coordinate value in the transverse direction of the pitch is not changed.

As another example, for the relative location of the target player of the second match, a coordinate obtained by adding a predetermined proportion of the total length of the pitch in the offense/defense direction to the distance ΔX2 in the offense/defense direction between the average location and the location data of the target player in the second match may be computed as a corrected location of the target player in the second match. As in the first match, among the location data of the target player, the coordinate value in the transverse direction of the pitch is not changed.

In this embodiment, the origin of the coordinate system representing the location data is set as the end of the pitch in the defense direction. However, it will be appreciated that there are various methods of setting the origin of the coordinate system and that the spirit of the present disclosure is not limited to this embodiment.

Relative location heatmap data will be described based on relative location data at each corrected time point will be described below with reference to the drawing.

FIG. 12 shows relative location heatmap data of the location heatmap data of FIG. 9 according to an embodiment.

In detail, FIG. 12 is an example of the relative location heatmap data of the location heatmap data of FIG. 9 generated through the processes of FIGS. 10 and 11.

Referring to FIGS. 9 and 12, compared to uncorrected location heatmap data of a target player (see FIG. 9), corrected location heatmap data (see FIG. 12) shows a reduced deviation between the first game and the second game well.

With the analysis method according to an embodiment, by minimizing the influences of various factors that may occur in each match in which a target player plays, it is possible to accurately analyze and evaluate location data related to the target player.

Also, the method of correcting the location heatmap data of the athlete has been mainly described above, but embodiments of the present disclosure are not limited thereto.

As an example, the data analysis device 2000 may pre-process location heatmap data obtained by combining location heatmap data of a plurality of players. That is, the second controller 2002 may pre-process all location heatmap data for a target entity as well as a location heatmap of a player. For example, when the target entity is a team, the second controller 2002 may pre-process data obtained by combining location heatmap data of all players who are identified as one team. When the target entity includes a plurality of players who perform some positions, the second controller 2002 may pre-process data obtained by combining location heatmap data of the plurality of players.

In this way, the data analysis device 2000 may pre-process all location heatmap data related to the target entity.

A method of pre-processing dynamic data acquired from an athlete will be described below with reference to the drawing.

First, a method of the data analysis device 2000 correcting dynamic heatmap data will be schematically described with reference to the drawing.

Figure 13:
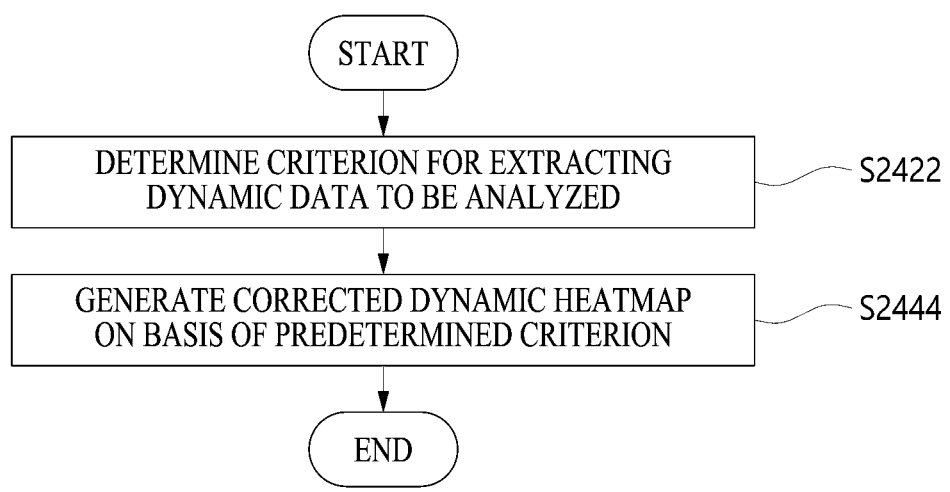
FIG. 13 is a schematic flowchart of a method of a data analysis device 2000 correcting dynamic heatmap data.

FIG. 13 is a schematic flowchart of a method of a data analysis device 2000 correcting dynamic heatmap data.

Referring to FIG. 13, the method of correcting dynamic heatmap data may include determining a criterion for extracting dynamic data to be analyzed (S2422) and generating a corrected dynamic heatmap on the basis of the determined criterion (S2442).

First, in the criterion determination step S2422, the data analysis device 2000 may determine the criterion in consideration of the characteristics of a target entity.

Here, the characteristics of the target entity may vary. For example, the characteristics of the target entity may include the level of a league in which the target entity plays, the age of the target entity, the career of the target entity, a competition in which the target entity participates, etc.

In detail, the second controller 2002 may set the criterion of the dynamic heatmap data for evaluating the target entity on the basis of prestored information regarding the characteristics of at least one target entity.

Also, the criterion for correcting the dynamic heatmap data may be determined in various forms. For example, the criterion for correcting the dynamic heatmap data may be a specific speed value, a specific acceleration value, a specific jerk value, a specific direction, or the like and may also be set to a combination or range thereof.

Here, the method of determining the criterion for extracting the dynamic data to be analyzed will be described in detail below.

When the criterion for analyzing the dynamic data is set (S2422), the second controller 2002 may generate a corrected dynamic heatmap data on the basis of the set criterion (S2442). Examples of the corrected dynamic heatmap data will be described in detail below.

The method of the data analysis device 2000 determining the criterion for extracting the dynamic data, which is subject to the analysis method according to an embodiment, and examples of the corrected dynamic heatmap data corrected according to the criterion will be described below with reference to the drawings.

Figure 14:
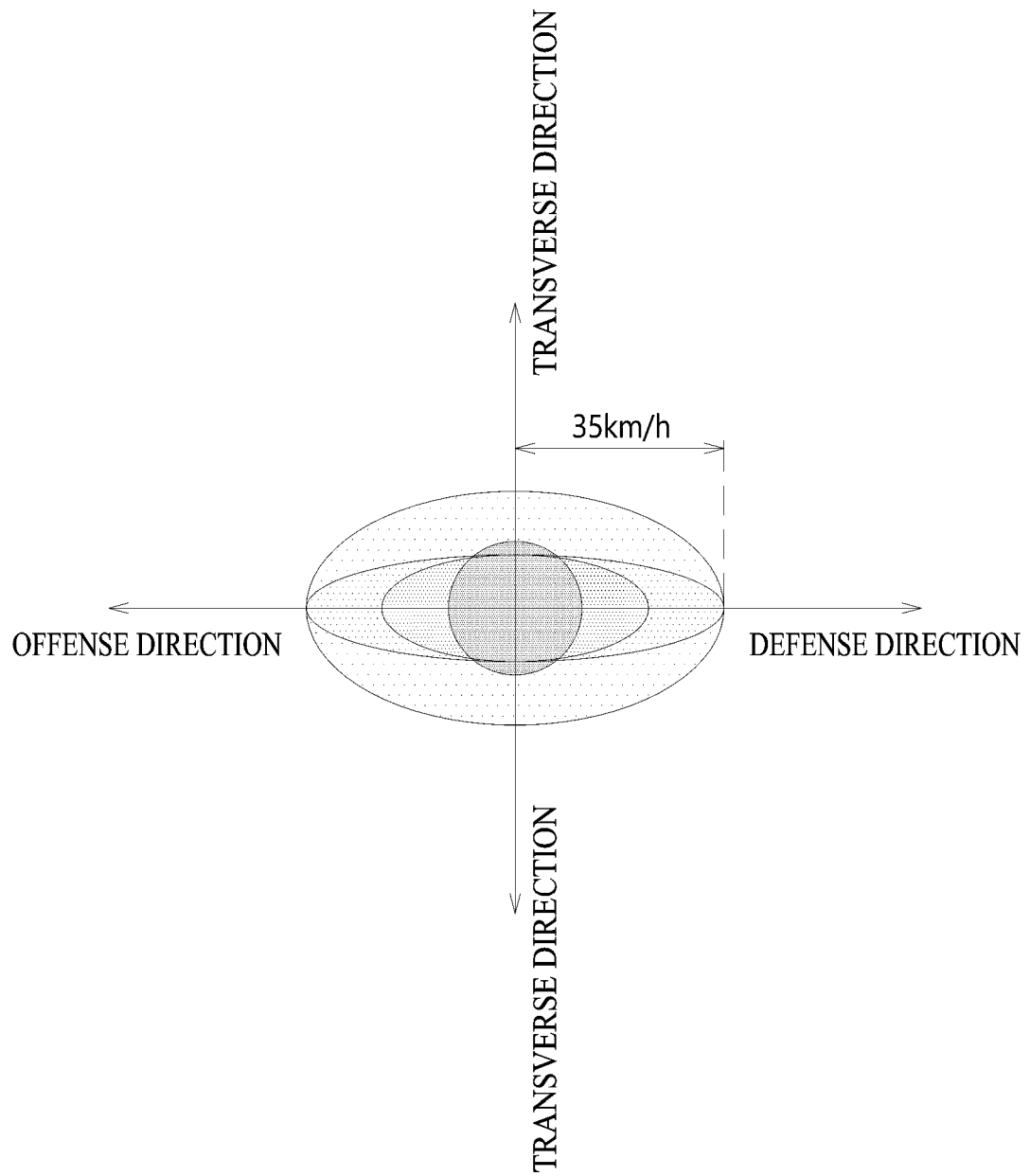
FIG. 14 shows an example of uncorrected dynamic heatmap data according to an embodiment.

FIG. 14 shows an example of dynamic heatmap data according to an embodiment.

Referring to FIG. 14, the data analysis device 2000 may generate dynamic heatmap data. For example, velocity heatmap data, which is a set of velocity data of an athlete during a match, is shown in the dynamic heatmap data shown in the drawing. Specifically, the size value of each piece of the shown velocity data represents the speed of the athlete at a specific time point, and a direction vector of each piece of velocity data may represent the movement direction of the athlete at a specific time point.

Here, the velocity heatmap data may be acquired based on the above-described location heatmap data. As an example, the velocity heatmap data may be acquired by differentiating the location heatmap data.

For example, FIG. 14 shows the distribution of the velocity of movement performed by the athlete during a match. In detail, it is shown that the corresponding athlete has a higher movement frequency in the offense/defense direction than in the transverse direction and performs a movement with the maximum speed of about 35 km/h.

In the drawing, the corresponding velocity heatmap data shows that the athlete has similar dynamic frequency distributions in a low-speed section and a high-speed section. In this case, since the only data that can be meaningfully acquired from the dynamic heatmap data in terms of evaluation of the athlete's ability is information about the direction, it is necessary to process the dynamic heatmap data to extract meaningful velocity data.

A method of the data analysis device 2000 correcting dynamic heatmap data will be described below with reference to the drawing.

Figure 15:
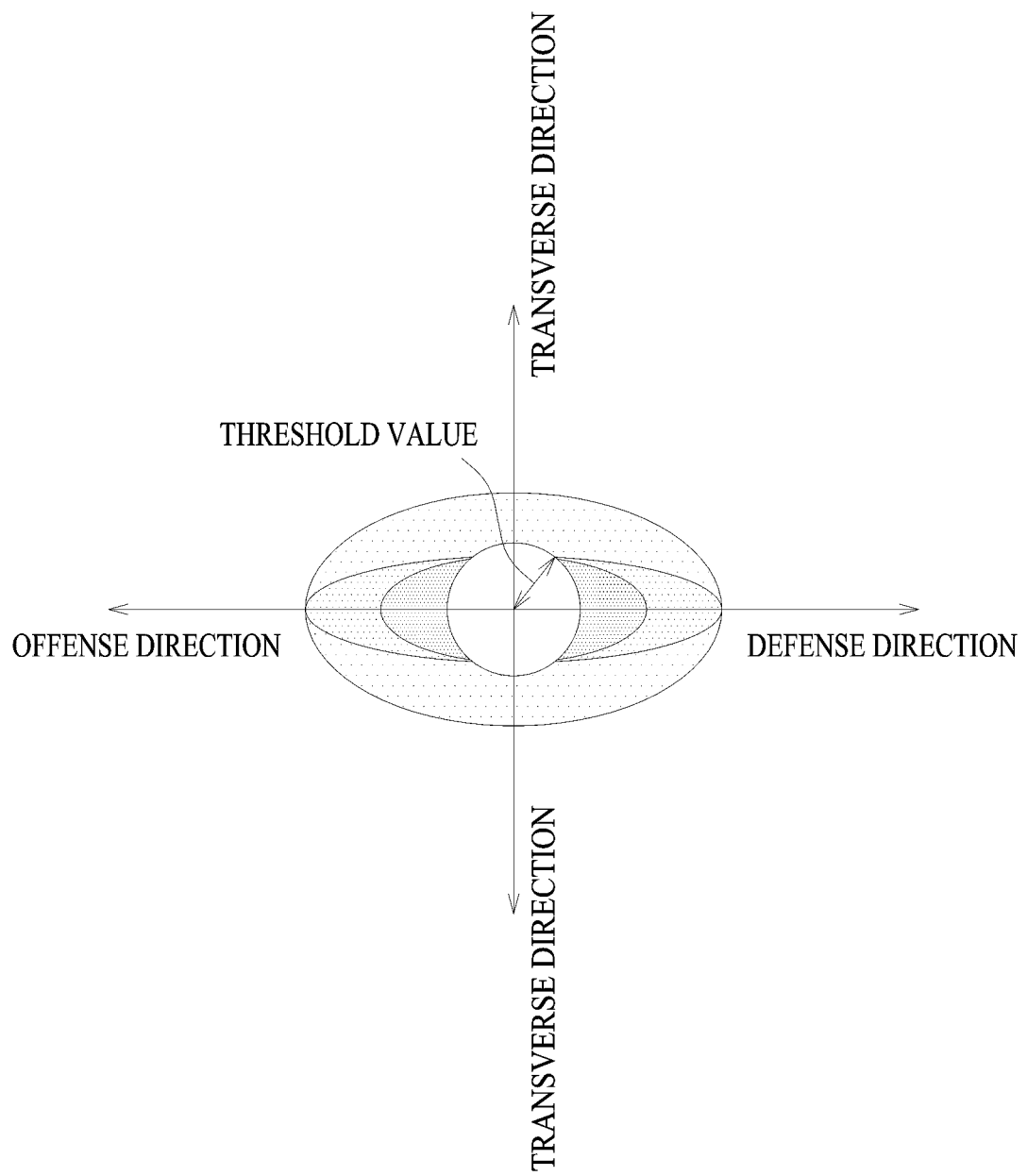
FIG. 15 shows an example of corrected dynamic heatmap data according to an embodiment.
Figure 16:
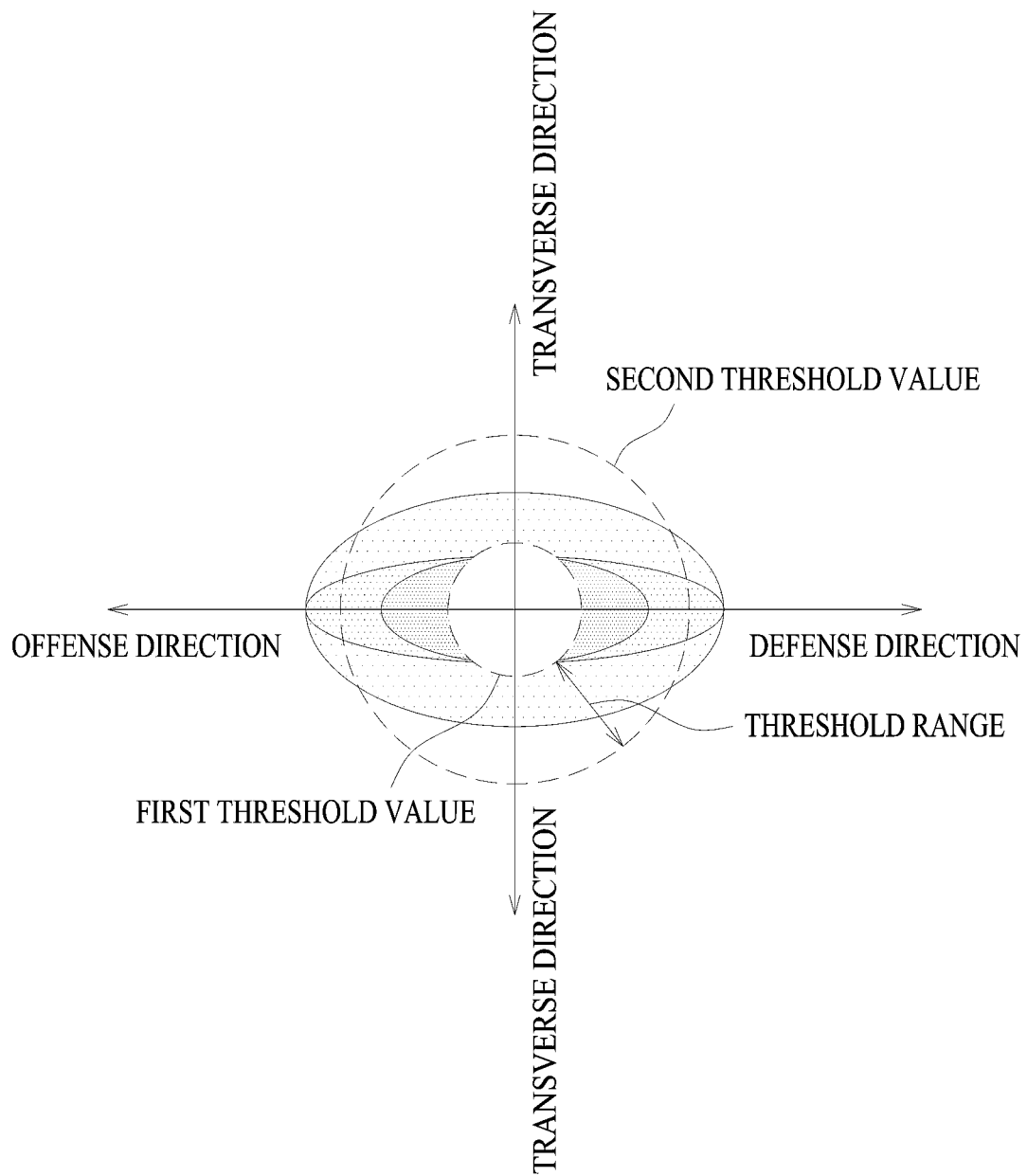
FIG. 16 shows another example of corrected dynamic heatmap data according to an embodiment.
Figure 17:
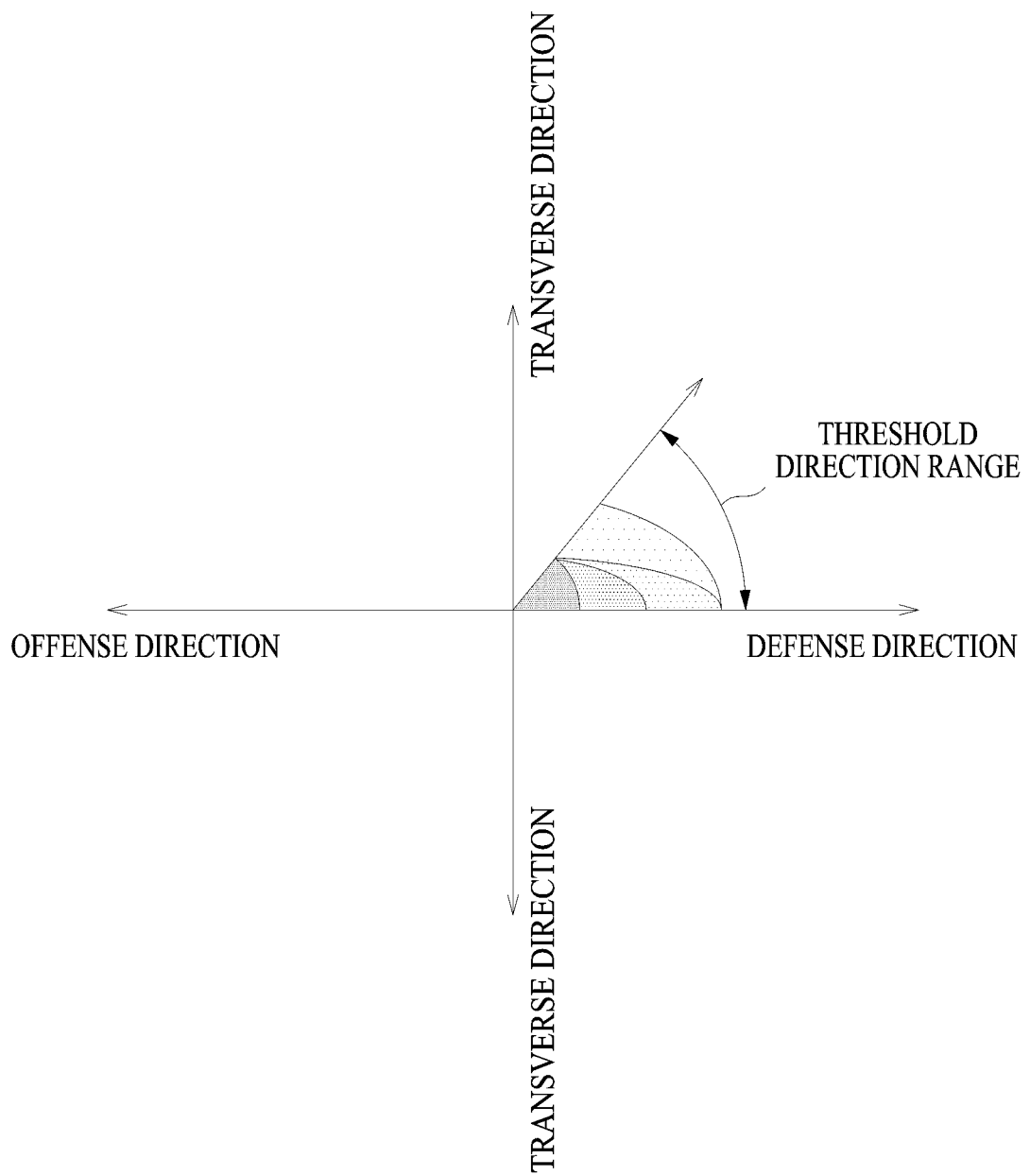
FIG. 17 shows another example of corrected dynamic heatmap data according to an embodiment.

FIGS. 15 to 17 show various examples of dynamic heatmap data obtained by correcting the dynamic heatmap data of FIG. 14 according to an embodiment.

Referring to FIGS. 15 to 17, the data analysis device 2000 may process dynamic heatmap data to generate corrected dynamic heatmap data. Specifically, the second controller 2002 may process dynamic heatmap data according to a predetermined criterion to correct the dynamic heatmap data.

Here, the predetermined criterion may be determined in consideration of the characteristics of a target entity such that the target entity's ability is accurately evaluated.

As an example, the predetermined criterion may be set in consideration of a sport that is played by the target entity. This is because for example, in the case of sports such as soccer, motions that are less related to ability evaluation, such as walking or jogging at low speeds, occur frequently depending on the location of a ball and motions that can evaluate the ability or tactical movement of an athlete occurs mainly occur in a sprint section or during high-speed movements. Accordingly, the predetermined criterion in sports such as soccer may be the magnitude of speed or the magnitude of acceleration.

Also, the predetermined criterion may be set in consideration of the ability level of the target entity. Here, various factors may be comprehensively considered in considering a player's ability level. For example, the factors may include the age or gender of a player, the level of a sport match, a friendly match, or a competition. As described above as an example, this is because the target entity may not be accurately evaluated when the same criterion is applied to a youth player and an adult player or a high-level professional match or a relatively low-level of professional match in order to uniformly extract dynamic data.

Various criteria that may be set in processing dynamic heatmap data and dynamic heatmap data that is corrected according to a corresponding criterion will be exemplarily described below with reference to the drawings.

FIG. 15 shows an example of corrected dynamic heatmap data according to an embodiment.

Referring to FIG. 15, the predetermined criterion may be set based on speed. Specifically, the second controller 2002 may generate velocity heatmap data on the basis of velocity data with a speed greater than or equal to a threshold value.

Here, the predetermined criterion may be determined based on pre-acquired dynamic data of a plurality of players 1. As an example, the predetermined criterion may be determined based on a result of analyzing dynamic data pre-acquired from a plurality of players who are active in the level of a match in which a target entity plays.

For example, when it is determined that velocity data greater than or equal to 15 km/h is meaningful in consideration of the level of a league in which the target entity plays and an age-specific level of the target entity, the predetermined criterion may be a speed of 50 km/h. That is, the second controller 2002 may generate velocity heatmap data including only velocity data with a speed greater than or equal to the predetermined criterion and may evaluate the target entity on the basis of the generated velocity heatmap data.

FIG. 16 shows another example of corrected dynamic heatmap data according to an embodiment.

Referring to FIG. 16, the predetermined criterion may be variously set within a numerical range included in dynamic data acquired from an athlete. As an example, when velocity data within a predetermined speed range of an athlete is used for data analysis, the predetermined criterion may be the speed range of the athlete.

FIG. 17 shows another example of corrected dynamic heatmap data according to an embodiment.

Referring to FIG. 17, when velocity data within a predetermined direction range of an athlete is used for data analysis, the predetermined criterion may be a specific direction range of the movement of the athlete. That is, in the case of a sport where the direction of the movement performed by the athlete is more important than the speed thereof, the predetermined criterion may be a specific direction or a specific direction range in which the athlete plays.

The correction of the speed heatmap data has been described above with reference to the drawing, but it will be understood that similar methods may be performed to correct acceleration heatmap data or jerk heatmap data.

Also, the method of correcting the dynamic heatmap data of the athlete has been mainly described above. Similar to the correction of the location heatmap data, however, embodiments of the present disclosure are not limited thereto.

As an example, the data analysis device 2000 may pre-process dynamic heatmap data obtained by combining dynamic heatmap data of a plurality of players. That is, the second controller 2002 may pre-process all dynamic heatmap data for a target entity in combination or individually as well as a dynamic heatmap of a player. For example, when the target entity is a team, the second controller 2002 may pre-process data obtained by combining dynamic heatmap data of all players who are identified as one team. When the target entity includes a plurality of players who perform a specific position, the second controller 2002 may pre-process data obtained by combining dynamic heatmap data of the plurality of players.

In this way, the data analysis device 2000 may pre-process all dynamic heatmap data related to the target entity.

The method of the data analysis device 2000 correcting sport heatmap data has been described above.

A method of the data analysis device 2000 analyzing corrected heatmap data will be described below with reference to the drawing.

According to an embodiment, the data analysis device 2000 may perform data analysis using corrected heatmap data. Specifically, the second controller 2002 inputs the corrected heatmap data to the analysis algorithm and evaluates the target entity on the basis of an output result of the analysis algorithm.

Here, the data analysis device 2000 according to an embodiment may use various analysis algorithms.

As an example, the data analysis algorithm may be provided in the form of a machine learning model. A representative example of the machine learning model includes a dimension reduction technique that converts a sample in a high-dimensional space into a low-dimensional space while preserving the variance of data as much as possible. Here, representative examples of the dimension reduction technique include principal component analysis (PCA), support vector machine (SVM), and non-negative matrix decomposition (NMF), and the like. In addition, various machine learning techniques, such as the k-nearest neighbor algorithm (KNN) and the random forest, may be used, and an ensemble form of the aforementioned techniques or various combinations thereof may be used as the analysis algorithm according to an embodiment.

In addition, the machine learning model according to an embodiment may be provided in the form of an artificial neural network. A representative example of the artificial neural network is a deep learning-based artificial neural network including an input layer, an output layer, and a hidden layer that processes data between the input layer and the output layer. However, the present invention is not limited thereto, and various forms of artificial neural networks may also be used.

Furthermore, the analysis algorithm in this disclosure is not necessarily limited to the machine learning model. That is, the analysis algorithm may include various determination/decision algorithms other than the machine learning model.

Accordingly, it should be noted in advance that the analysis algorithm in this specification should be interpreted in a comprehensive sense including all types of algorithms capable of performing data analysis and athlete evaluation using data of athletes.

However, for convenience of description, an analysis algorithm using the machine learning model related to the dimension reduction technique will be mainly described below. Thus, obviously, the analysis algorithm in the present disclosure would not be limited to the dimension reduction technique-based machine learning model.

FIG. 18 is a flowchart showing an exemplary method of a data analysis device analyzing data using corrected heatmap data.

Referring to FIG. 18, the data analysis method according to an embodiment may include extracting a principal component from heatmap data (S3200), acquiring a feature index on the basis of the extracted principal component (S3400), and evaluating a target entity on the basis of the feature index (S3600).

First, in the method of extracting a principal component (S3200), the data analysis device 2000 may extract a principal component of sport heatmap data. Here, a principal component is a vector included in heatmap data and refers to an eigenvector for reducing and re-expressing high-dimensional data distribution so as to analyze the distribution of a plurality of pieces of sport data which is present as a vector. Also, here, a principal component may be a predetermined eigenvector which is extracted from pre-acquired sport heatmap data of a plurality of players 1.

Specifically, the second controller 2002 may extract at least one principal component from each piece of the sport heatmap data in consideration of the type of sport data. For example, a location heatmap data-related principal component and a dynamic heatmap data-related principal component may be different from each other. Hereinafter, a principal component extracted from location heatmap data is referred to as a "location-specific principal component," and a principal component extracted from dynamic heatmap data is referred to as a "dynamic principal component."

Also, the second controller 2002 may extract at least one principal component in consideration of the characteristics of a sport object. Here, the characteristics of the sport object may vary. Specifically, the characteristics of the sport object may be tactical characteristics in a sport match. For example, the characteristics of the sport object may include a position played by the sport object, a role performed in a match by the sport object, and the like. Also, the characteristics of the sport object may be individual characteristics of an athlete. For example, the characteristics of the sport object may include the athlete's age, gender, and the like. Also, the characteristics of the sport object may include a sport level. For example, the characteristics of the sport object may include the level of a league in which the sport object plays, the level of a competition in which the sport object has participated, whether it is a friendly match, and the like. The extraction of principal components in consideration of the characteristics of the sport object will be described in detail below.

Also, the principal component may reflect various elements of a sport. As an example, the principal component may reflect a tactical situation of a sport match. Specifically, the principal component may reflect whether a match played by an athlete is offensive or defensive. As another example, the extracted principal component may reflect personal tendencies of the athlete. In addition to the previous example, it will be understood that the principal component may reflect all elements corresponding to the sport. In other words, it can be expressed that the second controller 2002 may extract the principal component, reflecting various elements of the sport.

Also, the second controller 2002 may extract at least one principal component in consideration of an index to be evaluated. For example, when an index to be evaluated from heatmap data of a target player is a tactical tendency of a target player, the second controller 2002 may extract a principal component such that a weight value extracted by the principal component reflects the tactical tendency of the target player. This will be described in detail later.

After the step of extracting the principal component (S3200), the data analysis device 2000 may acquire a feature index on the basis of the extracted principal component. Specifically, the second controller 2002 may acquire a feature index of the sport heatmap data corresponding to the principal component on the basis of the principal component extracted from the sport heatmap data.

Here, the feature index may refer to a weight value of the sport heatmap data for each principal component so as to express the sport heatmap data through the principal components. Also, the feature index may refer to a feature vector for the principal component. That is, the feature index may be expressed in the form of a feature vector.

The principal component of the sport heatmap data and the feature index will be described in more detail below.

After the step of acquiring the feature index (S3400), the data analysis device 2000 may evaluate the target entity on the basis of the acquired feature index. Specifically, the second controller 2002 may evaluate the target entity on the basis of the feature index of the target entity in consideration of the characteristics of the target entity. Here, the target entity evaluation method may vary depending on the target entity. The evaluation of the target entity will be described in detail below.

The above-described steps of the data analysis method performed by the data analysis device 2000 are not necessary, and some of the steps may be omitted. That is, for example, the data analysis device 2000 may omit the step of extracting the principal component and then acquire the feature index of the target player using a prestored principal component. As described above, the methods performed by the data analysis device 2000 according to this embodiment may be performed individually or in combination, and some of the methods may be omitted.

Another example of a schematic analysis method for corrected heatmap data performed by the data analysis device 2000 will be described below.

FIG. 19 is a flowchart showing another example of a method of a data analysis device analyzing data using corrected heatmap data.

The method of analyzing corrected heatmap data according to an embodiment, which is performed by the data analysis device 2000, may include acquiring a feature index for a predetermined principal component from the heatmap data (S4200) and evaluating a target entity on the basis of the acquired feature index (S4400).

According to an embodiment, the data analysis device 2000 may acquire a feature index of a target player from sport heatmap data of the target player on the basis of a principal component pre-acquired from sport heatmap data related to at least one athlete (S4200). Specifically, the second controller 2002 may acquire a feature index of a target player from sport heatmap data of the target player on the basis of a principal component pre-extracted from heatmap data of at least one athlete which is stored in the memory 2200. Here, the pre-acquired principal component may be acquired from a plurality of players through a scheme similar to that described above. Also, the pre-acquired principal component will be described in detail below.

Subsequently, the data analysis device 2000 may evaluate the target player on the basis of the feature index of the target player (S4400). Specifically, the second controller 2002 may evaluate the target player by analyzing the feature index of the target player on the basis of a feature index of at least one athlete which is prestored in the memory 2200.

Several examples of the method of the data analysis device 2000 analyzing the corrected heatmap data have been outlined.

Sub-methods included in the schematic analysis method performed by the data analysis device 2000 will be described in detail below with reference to the drawing.

As described above with reference to FIG. 19, the data analysis device 2000 may prestore principal components extracted from a plurality of pieces of heatmap data. In this regard, a method of the data analysis device 2000 extracting principal components on the basis of a plurality of pieces of pre-acquired heatmap data will be described first.

Figure 20:
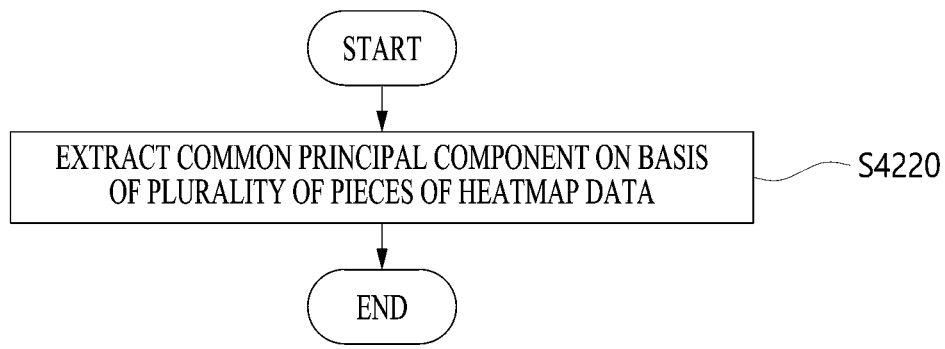
FIG. 20 is related to a method of a data analysis device extracting principal components from a plurality of pieces of heatmap data according to an embodiment.

FIG. 20 is related to a method of the data analysis device 2000 extracting principal components from a plurality of pieces of heatmap data according to an embodiment.

According to an embodiment, the data analysis device 2000 may extract a principal component common to a plurality of heatmaps (hereinafter referred to as a common principal component) from a plurality of pieces of pre-acquired heatmap data. Specifically, the second controller 2002 may extract a principal component common to a plurality of pieces of heatmap data on the basis of a plurality of pieces of sport heatmap data related to a plurality of players.

Here, the second controller 2002 may combine the plurality of pieces of sports heatmap data and use the combination as a basis for extracting common principal components. For example, the plurality of pieces of heatmap data may be summed up and used as a basis for extracting common principal components. As another example, an average value of the plurality of pieces of heatmap data may be used as a basis for extracting common principal components. It will be understood that a plurality of pieces of heatmap data may be combined with each other through various methods in addition to the method mentioned by way of example.

Also, here, the second controller 2002 may cluster the plurality of pieces of sports heatmap data in various ways and use the cluster as a basis for extracting common principal components. As an example, the plurality of pieces of sport heatmap data may be clustered in consideration of the characteristics of an athlete. Here, the characteristics of the athlete may vary as described above. That is, as a specific example, the second controller 2002 may extract common principal components on the basis of sport heatmap data related to only a plurality of players having a first characteristic, may extract common principal components on the basis of sport heatmap data related to only a plurality of players having a second characteristic, or may extract common principal components on the basis of sport heatmap data related to only a plurality of players having both of the first characteristic and the second characteristic.

Also, here, the data analysis device 2000 may extract a principal component for evaluating a specific ability of a player from the plurality of pieces of heatmap data. Specifically, the second controller 2002 may extract, from a plurality of sport heatmap of a plurality of players, a common principal component determined to extract a feature index capable of reflecting a specific movement characteristic of a player. That is, the extracted common principal component may have its own meaning, and the meaning of a feature index acquired from the sport heatmap data according to the form of the extracted common principal component may also be changed. This means that a player evaluation method may also be diversified depending on a scheme of extracting a common principal component, and the meaning of the common principal component will be described in detail below.

Also, the common principal component may include a plurality of common principal components. Specifically, as the common principal component, at least one principal component having the smallest variance may be extracted from the principal components of the plurality of pieces of heatmap data.

Also, the number of common principal components may correspond to the type of heatmap data. As a specific example, six common components for location heatmap data of a plurality of players may be extracted, and four common components for speed heatmap data thereof may be extracted.

The method of the data analysis device 2000 extracting common principal components on the basis of a plurality of pieces of heatmap data has been described above. A method of the data analysis device 2000 extracting common principal components on the basis of a plurality of principal components will be described below.

Figure 21:
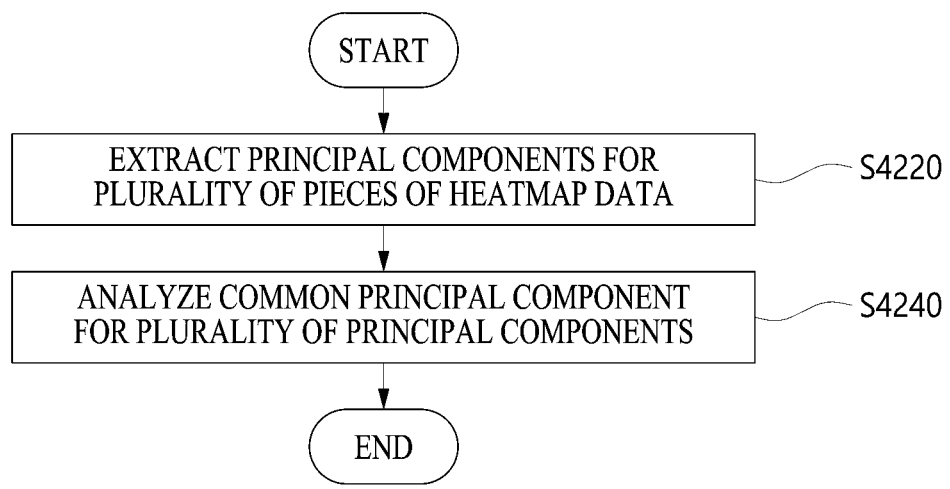
FIG. 21 is a flowchart showing a method of a data analysis device processing principal components acquired from a plurality of pieces of heatmap data according to an embodiment.

FIG. 21 is a flowchart showing a method of a data analysis device processing principal components acquired from a plurality of pieces of heatmap data according to an embodiment.

Referring to FIG. 21, the data analysis device 2000 may extract principal components from a plurality of pieces of heatmap data of a plurality of players. Specifically, the second controller 2002 may extract principal components from pre-acquired sport heatmap data of a plurality of players.

Subsequently, the data analysis device 2000 may analyze a plurality of the extracted principal components and extract a common principal component including a component common to at least some of the plurality of principal components. Specifically, the second controller 2002 may extract a principal component common to the plurality of principal components from the plurality of principal components extracted from the plurality of pieces of sport heatmap data of the plurality of players.

In addition, various methods capable of extracting common principal components are similar to those described above, and thus a detailed description thereof will be omitted.

A method of the data analysis device 2000 extracting a principal component from a plurality of pieces of sport heatmap data in consideration of the characteristics of a sport object will be described below with reference to the drawing.

Figure 22:
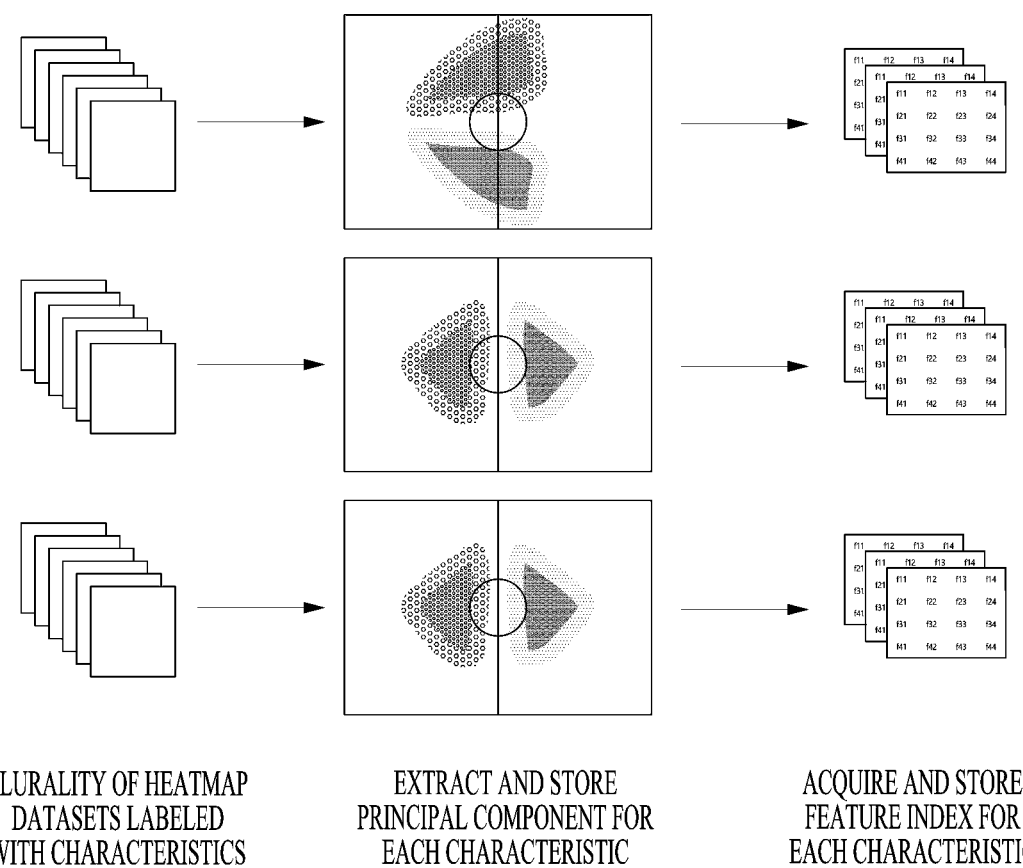
FIG. 22 shows a method of a data analysis device extracting a principal component in consideration of the characteristics of an athlete according to an embodiment.

FIG. 22 shows a method of the data analysis device 2000 extracting principal components in consideration of the characteristics of an athlete according to an embodiment.

Referring to FIG. 22, first, the data analysis device 2000 may acquire a plurality of heatmap data sets labeled with the characteristics of a sport object. Specifically, the second controller 2002 may acquire a plurality of pieces of sport heatmap data labeled with the characteristics of a sport object. Here, the characteristics of the sport object may be similar to those described above.

When the plurality of heatmap datasets labeled with the characteristics are acquired, the data analysis device 2000 may extract a principal component corresponding to each characteristic and store the extracted principal component. Specifically, the second controller 2002 may extract principal components by combining a plurality of pieces of sport heatmap data labeled with the same characteristic and may analyze the plurality of principal components extracted from the plurality of pieces of sport heatmap data labeled with the same characteristic to extract a common principal component for each characteristic.

When the common principal component corresponding to each characteristic is extracted, the data analysis device 2000 may acquire a feature index of an athlete on the basis of the common principal component corresponding to each characteristic. Specifically, by using a common principal component corresponding to a characteristic that the athlete may have, the second controller 2002 may acquire a feature index corresponding to the athlete's characteristic.

The second controller 2002 may store a plurality of acquired feature indices in the memory 2200.

A plurality of feature indices labeled with an athlete's characteristic may be used as data for evaluating a feature index of a target player, as described below.

That is, the data analysis device 2000 according to an embodiment may accurately evaluate a target player by acquiring a feature index corresponding to the target player's characteristic and performing evaluation in consideration of the target player's characteristic.

The method of the data analysis device 2000 extracting common principal components or principal components reflecting characteristics from a plurality of pieces of sport heatmap data has been described above.

However, according to an embodiment of the present disclosure, it is possible to acquire a plurality of feature indices on the basis of principal components not reflecting the characteristics of the sport object and cluster a plurality of players by characteristic on the basis of the plurality of acquired feature indices.

Figure 23:
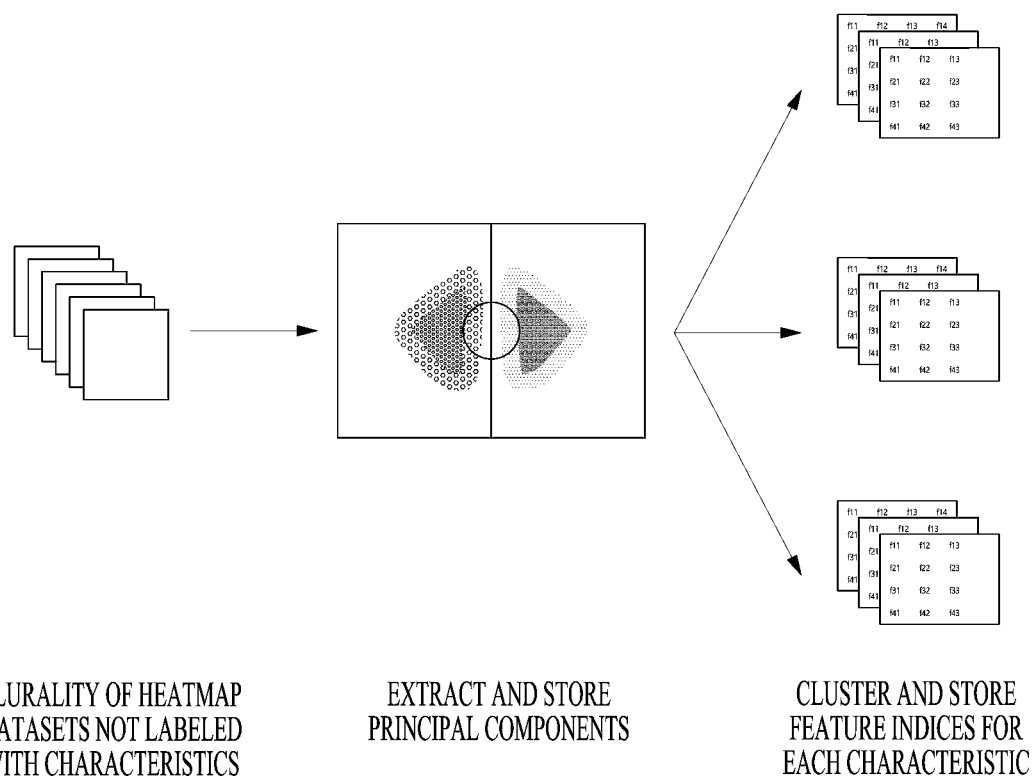
FIG. 23 shows a method of a data analysis device clustering sport objects by characteristic on the basis of a plurality of feature indices according to an embodiment.

FIG. 23 shows a method of a data analysis device clustering sport objects by characteristic on the basis of a plurality of feature indices according to an embodiment.

Referring to FIG. 23, the data analysis device 2000 may extract principal components from a dataset including a plurality of pieces of heatmap data. Specifically, the second controller 2002 may extract common principal components on the basis of a plurality of pieces of sport data acquired from a plurality of athletes. Here, the method of extracting common principal components is as described above.

When the common principal components are extracted, the data analysis device 2000 may compute feature indices of the plurality of players. Specifically, the second controller 2002 may acquire feature indices of the plurality of players by analyzing sport heatmap data of each of the plurality of players on the basis of the extracted common principal components.

When the feature indices of the plurality of players are acquired, the data analysis device 2000 may analyze and cluster a plurality of the feature indices. In detail, the second controller 2002 may cluster the plurality of feature indices according to a predetermined criterion. Here, the predetermined criterion may vary. As an example, the predetermined criterion may be similarity between feature indices. As another example, the predetermined criterion may be similarity of a feature index of a specific principal component.

Subsequently, the data analysis device 2000 may store the clustered data in the memory 2200.

The meaning of the extracted principal component or the extracted common principal component will be described in detail below with reference to the drawing.

Figure 24:
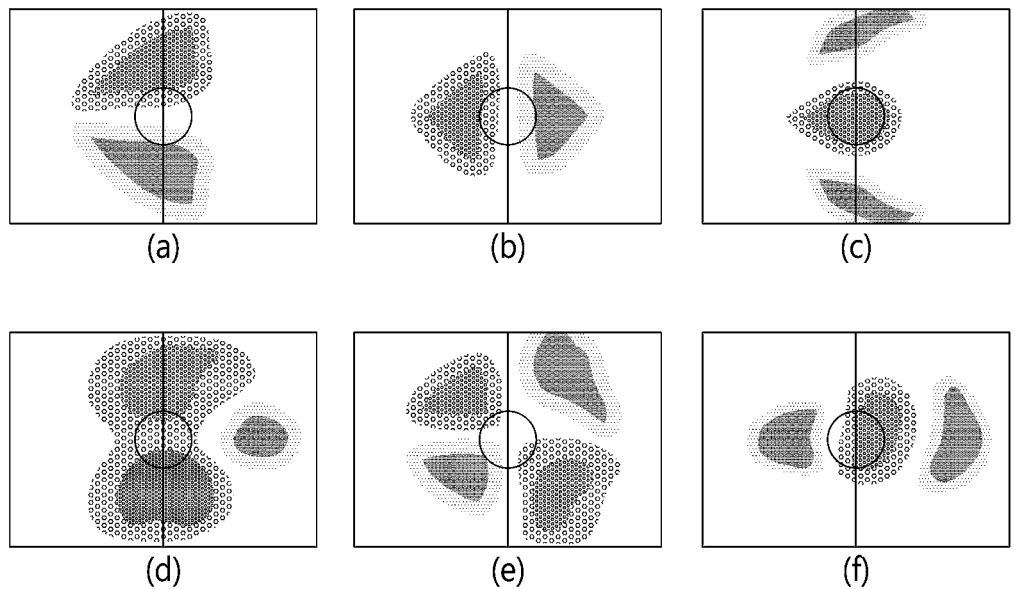
FIG. 24 shows exemplary location heatmap data-related common principal components according to an embodiment.
Figure 25:
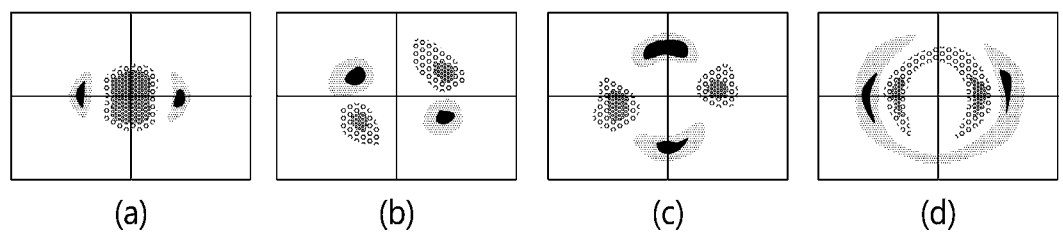
FIG. 25 shows exemplary dynamic heatmap data-related common principal components according to an embodiment.

FIGS. 24 and 25 show exemplary common principal components according to an embodiment.

First, FIG. 24 shows exemplary location heatmap data-related common principal components according to an embodiment.

Referring to FIG. 24, common principal components extracted from a plurality of pieces of location heatmap data pre-acquired from a plurality of players are shown.

Also, the data analysis device 2000 may evaluate a target player on the basis of a feature index corresponding to a location heatmap data-related common principal component. Specifically, the second controller 2002 may evaluate a target player's athletic ability using a feature index of the target player extracted based on a location heatmap data-related common principal component having a specific meaning. Here, the target player's athletic ability may refer to everything to be evaluated in a sport match, such as an athlete's tactical movement, personal athletic ability, etc.

As described above, the common principal components acquired from the plurality of players may have their own meanings, and a feature index of the target player extracted based on a corresponding common principal component according to the meaning of the common principal component may reflect the meaning of the corresponding common principal component.

(a) Line-Driven Play

Six common principal components illustrated in the drawing are only examples. Therefore, it will be understood that the present disclosure is not limited to these examples and more than six or less than six common principal components may be extracted.

First, referring to 24A, a common principal component with a meaning for determining a characteristic related to a tendency to mainly play on the side (hereinafter referred to as "side play") is shown.

The common principal component expressed as side play shows that a location occupancy frequency is high on one side of a stadium. A target player-related feature index acquired based on the side-play common principal component may be a basis for evaluating the target player's side play. Specifically, when a result of analyzing location heatmap data of the target player is that the feature index for the side play is measured as being high, this may mean that the target player has a high proportion of side play in the match where the location heatmap data is measured.

Also, referring to 24B, a common principal component for determining a characteristic related to a play with an offense tendency (hereinafter referred to as "offense play") is shown.

The common principal component expressed as offense play shows that a location occupancy frequency is high in an offense side part of the stadium. A target player-related feature index acquired based on the offense-play common principal component may be a basis for evaluating the target player's offense play. Specifically, when a result of analyzing location heatmap data of the target player is that the feature index for the offense play is measured as being high, this may mean that the target player has a high proportion of offense play in the match where the location heatmap data is measured.

Also, referring to 24C, a common principal component for determining a characteristic related to a tendency to play in a region other than the center (hereinafter referred to as "center avoidance play") is shown.

The common principal component reflecting the center avoidance play tendency shows that a location occupancy frequency is low in the central region of the stadium and high in regions other than the central region. A target player-related feature index acquired based on the common principal component representing this tendency may be a basis for evaluating the target player's tactical tendency. Specifically, when a result of analyzing location heatmap data of the target player is that the feature index for the center avoidance play is measured as being high, it may be evaluated that the corresponding player has a characteristic of playing primarily outside midfield.

Also, referring to 24D, a common principal component for determining a characteristic related to a tendency to play near a goalpost (hereinafter referred to as "poacher play") is shown.

The common principal component reflecting the poacher play tendency shows that a location occupancy frequency is dense near an offense side goalpost. A target player-related feature index acquired based on the common principal component representing this tendency may be useful in evaluating a target player who serves as a forward. A target player with a feature index for the poacher play tendency measured as being high may be evaluated as having a characteristic of mainly aiming to shoot for a goal in front of a goalpost rather than high activity.

Also, referring to 24E, a common principal component for determining a characteristic related to a switching play tendency is shown.

The common principal component reflecting the switching play tendency shows that a location occupancy frequency is dense in a diagonal direction of the stadium. A target player-related feature index acquired based on the common principal component representing this tendency may be used to determine whether to tactically perform a switching play.

Last, referring to 24F, a common principal component for determining a characteristic related to a tendency to prefer to play in a penalty box (hereinafter referred to as "box preference play") is shown.

The common principal component reflecting the box preference play shows that a location occupancy frequency is dense near a penalty box of the stadium. A target player-related feature index acquired based on the common principal component representing this tendency may be used to determine whether to tactically prefer to play in the penalty box.

In addition to the location heatmap data-related common principal components described above as examples, common principal components having various meanings for evaluating the characteristics or tendencies of an athlete may be extracted by the data analysis device 2000. It will be understood that embodiments that are related to various common principal components but not shown in the drawings are also included as part of the present disclosure.

An exemplary dynamic heatmap data-related common principal component will be described below with reference to the drawing.

FIG. 25 shows exemplary dynamic heatmap data-related common principal components according to an embodiment.

Referring to FIG. 25, the data analysis device 2000 may evaluate a target player on the basis of a feature index corresponding to a dynamic heatmap data-related common principal component. Specifically, the second controller 2002 may evaluate a target player's athletic ability using a feature index of the target player extracted based on a dynamic heatmap data-related common principal component having a specific meaning. Here, the target player's athletic ability may refer to everything to be evaluated in a sport match, such as an athlete's tactical movement, personal athletic ability, etc.

Like the above-described location heatmap data-related common principal component, the dynamic heat map data-related common principal component may also have a meaning reflecting the tendency or characteristics of a player.

First, referring to 25A, a common principal component representing a tendency to perform a movement in an offense-defense direction of a stadium (hereinafter referred to as "end-to-end") is shown. The end-to-end-related common principal component shows that a velocity frequency distribution for the movement in the offense-defense direction of the stadium is dense. A feature index extracted based on the end-to-end-related common principal component may reflect a player's tendency for the movement in the offense/defense direction of the stadium.

Also, referring to 25B, a common principal component representing a tendency to perform a movement in a diagonal direction of the stadium (hereinafter referred to as "diagonal movement") is shown. The diagonal movement tendency-related common principal component shows that a velocity frequency distribution for the movement in the diagonal direction of the stadium is dense. A feature index extracted based on the diagonal movement tendency-related common principal component may reflect a player's tendency for the movement in the diagonal direction of the stadium.

Also, referring to 25C, a common principal component representing a tendency to perform a movement in a side direction of the stadium (hereinafter referred to as "side movement") is shown. The side movement tendency-related common principal component shows that a velocity frequency distribution for the movement in the side direction of the stadium is dense. A feature index extracted based on the side movement tendency-related common principal component may reflect a player's tendency for the movement in the side direction of the stadium.

Also, referring to 25D, a common principal component representing a tendency to perform a high-speed movement (hereinafter referred to as "fast movement") is shown. The fast movement tendency-related common principal component shows that a speed frequency distribution for the high-speed movement is dense irrespective of the direction. A feature index extracted based on the fast movement tendency-related common principal component may reflect a player's tendency for the fast movement.

As described above, a principal component extracted from heatmap data may reflect a tendency for the characteristics of a sport object or an ability to be evaluated.

Also, a principal component may reflect corresponding sport match-specific internal factors. For example, a principal component may reflect match-specific internal factors such as an athlete's offense situation. As another example, a principal component may reflect match-specific internal factors such as an athlete's defense situation.

As described above, the player evaluation method performed by the data analysis device 2000 according to an embodiment reflects in detail the characteristics of the target player and the tendency for an ability to be evaluated, and thus a more comprehensive and detailed evaluation may be possible.

Also, only some principal components have been exemplarily described herein, but it is obvious that various examples that can be derived from the spirit of the present disclosure are also incorporated into the present disclosure.

The exemplary principal components have been described above with reference to the drawing. A feature index extracted based on a principal component will be described in detail with reference to the drawing.

FIG. 26 shows an example of an acquired feature index according to an embodiment.

Referring to FIG. 26, the data analysis device 2000 may acquire a feature index from sport heatmap data on the basis of the principal component. Specifically, the second controller 2002 may acquire a feature index of a target player on the basis of a principal component pre-acquired from a plurality of players. Also, the second controller 2002 may analyze sport heatmap data of the target player to extract a principal component and may acquire the feature index of the target player on the basis of the extracted principal component.

Also, here, the feature index may include both of a location data-related feature index and a dynamic data-related feature index, as described above.

Referring to FIG. 25 again, an exemplary location-specific principal component-related feature index and an exemplary dynamic principal component-related feature index are shown.

As shown in the drawing, a feature index corresponding to each principal component may be extracted. Also, a feature index may be extracted for each match. As an example, feature indices shown in the drawing include six location feature indices extracted for six principal components of location heatmap data and four dynamic feature indices extracted for four principal components of dynamic heatmap data on a match basis.

Here, as described above, each principal component may be a principal component pre-acquired from a plurality of players or may be a principal component acquired by analyzing heatmap data of a target player.

Also, here, although the drawing shows that a feature index is extracted for each match, the present invention is not necessarily limited thereto, and time criteria for acquiring the feature index may vary. That is, for example, the second controller 2002 may acquire a feature index by analyzing heatmap data during a portion of a match time and may also acquire a feature index by analyzing comprehensive heatmap data of a target player on a yearly basis.

Also, as described above, a feature index may be labeled with the characteristics of the sport object.

The method of analyzing heatmap data related to an athlete has been mainly described above. However, the above-described embodiments are not necessarily limited to players, and the method of the data analysis device 2000 analyzing heatmap data of a player may be applied to all target entities through substantially the same method.

As an example, the data analysis device 2000 may also analyze location heatmap data obtained by combining location heatmap data of a plurality of players. That is, the second controller 2002 may analyze all heatmap data of all target entities as well as heatmap data of players.

For example, when the target entity is a team, the second controller 2002 may perform an analysis method (e.g., the extraction of principal components and the extraction of a feature index) on data obtained by combining heatmap data of all players identified as one team. When the target entity includes a plurality of players who perform some positions, the second controller 2002 may perform an analysis method (e.g., the extraction of principal components and the extraction of a feature index) on data obtained by combining heatmap data of the plurality of players.

The method of the data acquisition device 1000 acquiring sport data and the method of the data analysis device 2000 pre-processing the acquired sport data and analyzing the pre-processed data according to an embodiment have been described above.

A method of the data analysis device 2000 evaluating a target player according to an embodiment will be described below.

According to an embodiment, the data analysis device 2000 may evaluate a target entity. Specifically, the second controller 2002 may evaluate a target entity on the basis of sport data acquired by the data acquisition device 1000. More specifically, the second controller 2002 may evaluate a target entity using a feature index of the target entity obtained by analyzing sport data that is acquired by the data acquisition device 1000 and that is related to the target entity.

Here, the evaluation method performed by the data analysis device 2000 may vary depending on the type of the target entity to be evaluated. This will be described in detail later.

Also, here, the meaning of evaluation should be interpreted comprehensively. That is, the concept of evaluation in the present disclosure should be comprehensively interpreted in the sense of providing a specific index for information related to sports, and any object that can be provided as a specific index related to sports may be subject to evaluation in the present disclosure.

As an example, the evaluation according to an embodiment may mean determining the type of the target entity.

As another example, the evaluation according to an embodiment may mean evaluating a target entity's sport ability. Here, the sport ability may be interpreted as a sport-related ability. As an example, the sport ability may refer to a personal athletic ability or a tactical performance ability. Specifically, by analyzing the individual athletic ability, it is possible to determine an ability to be improved and also provide information on an improvement method therefor. Also, the meaning of the evaluation in the present disclosure may include determining whether the target entity can replace a specific player. Also, the meaning of the evaluation in the present disclosure may include determining whether the target entity is suitable for a specific position. Also, the meaning of the evaluation in the present disclosure may include providing guidance regarding a growth direction of a youth player. Also, the meaning of the evaluation in the present disclosure may include predicting a position suitable for a youth player.

Also, the evaluation may provide the target entity's ability not only as an absolute index but also as a relative index to at least one other sport object. As an example, the evaluation in the present disclosure may also include determining the most suitable players for at least some of a sport team squad from among a plurality of players. Also, the meaning of the evaluation in the present disclosure may include predicting the winning percentages of sport teams. Also, the meaning of the evaluation in the present disclosure may include determining which formation to use depending on the opposing team. Also, the meaning of the evaluation in the present disclosure may include determining which player should participate depending on the opposing team. Also, the meaning of the evaluation in the present disclosure may include determining which player should participate depending on the opposing player.

In addition to the above-described examples, the meaning of the evaluation according to an embodiment of the present disclosure may include any method as long as the method is capable of performing determination on a sport played by the target entity using the feature index of the target entity.

First, when the target entity is a target player, a method of the data analysis device 2000 evaluating the target player will be described below.

Figure 27:
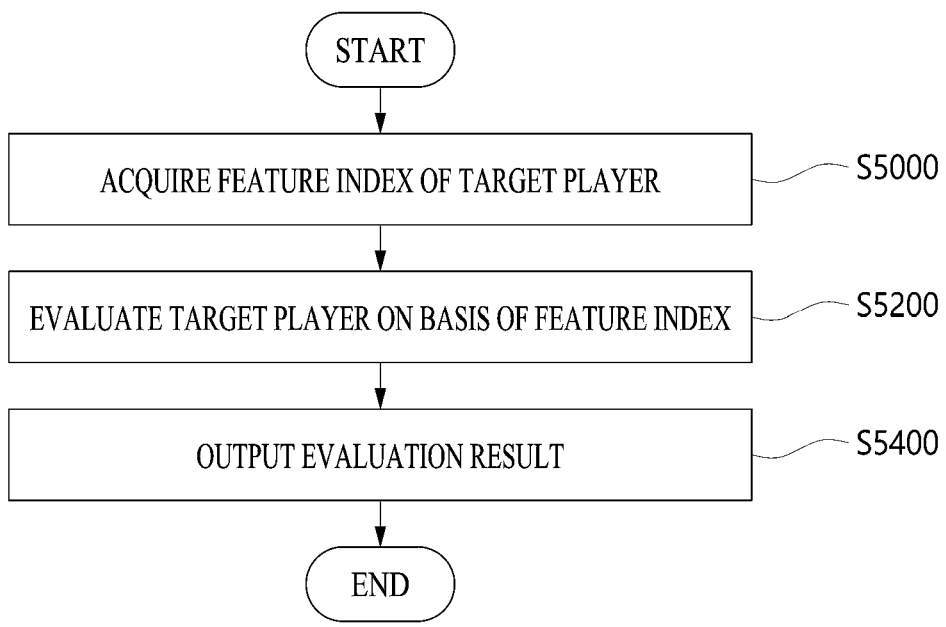
FIG. 27 shows an exemplary method of a data analysis device evaluating a target player according to an embodiment.

FIG. 27 shows an exemplary method of the data analysis device 2000 evaluating a target player according to an embodiment.

Referring to FIG. 27, the method of the data analysis device 2000 evaluating a target player according to an embodiment may include acquiring a feature index of the target player (S5000), evaluating the target player on the basis of the feature index (S5200), and outputting an evaluation result (S5400).

First, the data analysis device 2000 may acquire a feature index of the target player (S5000). This has been described in detail above, and thus a repetitive description thereof will be omitted.

When the feature index of the target player is acquired, the data analysis device 2000 may evaluate the target player on the basis of the feature index (S5200). Specifically, the second controller 2002 may evaluate the target player's sport ability using a feature index acquired by analyzing sport heatmap data of the target player.

Here, the method of evaluating the target player on the basis of the feature index may vary as described above.

As an example, the second controller 2002 may evaluate the target player on the basis of at least one feature index of a plurality of athletes stored in the memory 2200. Here, the target player may or may not be included in the plurality of athletes. More specifically, the second controller 2002 may compare the feature index of the target player to a feature index of at least one other athlete stored in the memory 2200 to determine the type of the target player. As another example, the second controller 2002 may determine whether the target player may replace another athlete. As another example, the second controller 2002 may compare feature indices of a plurality of players to determine the most suitable substitute player for a specific player from among the plurality of players. As another example, the second controller 2002 may predict the growth potential of a youth player. Specifically, the second controller 2002 may analyze a feature index of the youth player to determine another player having a similar feature index or determine a position suitable for the corresponding youth player.

As another example, the second controller 2002 may evaluate the target player on the basis of feature indices of a plurality of players labeled with the same characteristics as those of the target player. Specifically, the second controller 2002 may determine the ranking of the athletic ability of the target player among the plurality of players labeled with the same characteristics as those of the target player.

In addition to the above-described examples, as described above, the second controller 2002 may analyze sport data of the target player and evaluate everything that can be provided as an index.

After the step of evaluating the target player (S5200), the data analysis device 2000 may output a result of the evaluation (S5400). Specifically, the second controller 2002 may output the evaluation result through an output unit separately provided in the data analysis device 2000 and may transmit the evaluation result to an external device through the second communication module 2800.

A team evaluation method performed by the data analysis device 2000 when the target entity is a team will be described below.

Figure 28:
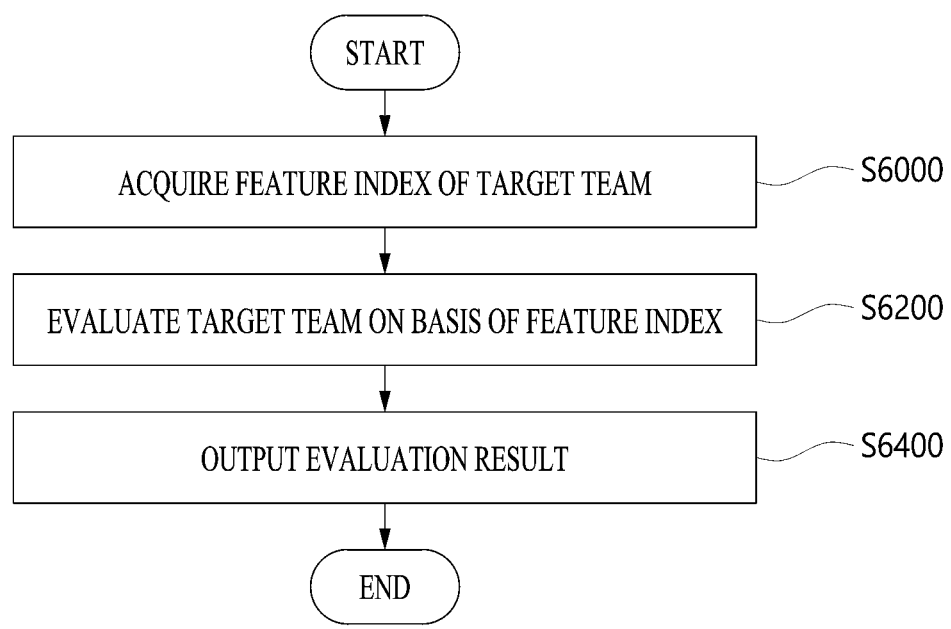
FIG. 28 shows an example of a team evaluation method performed by a data analysis device according to an embodiment.

FIG. 28 shows an exemplary team evaluation method performed by a data analysis device according to an embodiment.

Referring to FIG. 28, the team evaluation method may include acquiring a feature index of a target team (S6000), evaluating the target team on the basis of the feature index (S6200), and outputting a result of the evaluation (S6400).

First, the data analysis device 2000 may acquire a feature index of a target team (S6000). Here, the data analysis device 2000 may acquire the feature index of the target team in a similar way to the method of acquiring the feature index of the target player. As an example, the second controller 2002 may acquire the feature index of the target team on the basis of data related to at least one player included in the target team. Here, the data related to at least one player included in the target team may include, for example, sport heatmap data, a feature index, etc. More specifically, the second controller 2002 may acquire the feature index of the target team using data obtained by combining heatmap data of one or more players included in the target team or may acquire the feature index of the target team by combining feature indices of one or more players included in the target team.

Also, when feature indices of a plurality of teams are calculated, the data analysis device 2000 may calculate the feature indices by combining heatmap data of the plurality of teams or may compute feature indices of the plurality of teams by combining the feature indices of the plurality of teams.

When the feature index of the target team is acquired, the data analysis device 2000 may evaluate the target team on the basis of the feature index (S6200). Specifically, the second controller 2002 may evaluate the target team's sport ability using the feature index of the target team.

Here, the method of evaluating the target team on the basis of the feature index may vary as described above.

As an example, the second controller 2002 may evaluate the target team on the basis of a feature index of at least one sport team stored in the memory 2200. More specifically, the second controller 2002 may compare the feature index of the target team to a feature index of at least one other sport team stored in the memory 2200 to determine the type of the target team. Alternatively, the second controller 2002 may predict the ranking of the target team among a plurality of sport teams.

As another example, on the basis of the feature index of the target team and a feature index of at least one other sport team stored in the memory 2200, the second controller 2002 may compute the winning percentage of the target team against the other team.

Here, as described above, the feature index may be extracted from data obtained by combining heatmap data of the target team and the opposing team. That is, the data analysis device 2000 may compute the winning percentage of the target team against the opposing team on the basis of data obtained by combining the heatmap data of the target team and the other team.

In addition to the above-described examples, as described above, the second controller 2002 may analyze sport data of the target team and evaluate everything that can be provided as an index.

After the step of evaluating the target team (S6200), the data analysis device 2000 may output a result of the evaluation (S6400). Specifically, the second controller 2002 may output the evaluation result through an output unit separately provided in the data analysis device 2000 and may transmit the evaluation result to an external device through the second communication module 2800.

Figure 29:
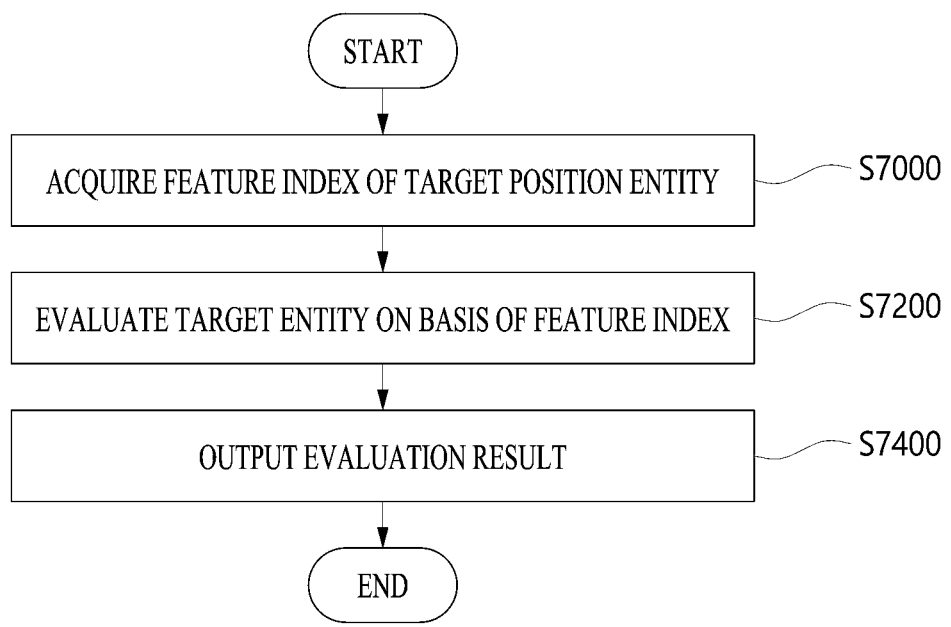
FIG. 29 shows an example of a target entity evaluation method performed by a data analysis device according to an embodiment.

FIG. 29 shows an exemplary target entity evaluation method performed by a data analysis device according to an embodiment.

Referring to FIG. 29, the target entity evaluation method may include acquiring a feature index of a target team (S7000), evaluating a target entity on the basis of the feature index (S7200), and outputting a result of the evaluation (S7400).

First, the data analysis device 2000 may acquire a feature index of a target entity (S7000). The target entity in the present embodiment includes, for example, one or more players who perform a specific role or a specific position.

The data analysis device 2000 may acquire the feature index of the target entity in a similar way to the method of acquiring the feature index of the target player or the target team. As an example, the second controller 2002 may acquire the feature index of the target entity on the basis of data related to at least one player included in the target entity. Here, the data related to at least one player included in the target entity may include, for example, sport heatmap data, a feature index, etc.

More specifically, the second controller 2002 may acquire the feature index of the target entity using data obtained by combining heatmap data of one or more players included in the target entity or may acquire the feature index of the target entity by combining feature indices of one or more players included in the target entity.

Also, when a feature index of a target entity including a plurality of players is calculated, the data analysis device 2000 may calculate the feature index by combining all heatmap data related to the target entity or may compute the feature index of the target entity by combining feature indices of the players included in the target entity.

When the feature index of the target entity is acquired, the data analysis device 2000 may evaluate the target entity on the basis of the feature index (S7200). Specifically, the second controller 2002 may evaluate the target entity's sport ability using the feature index of the target entity.

Here, the method of evaluating the target entity on the basis of the feature index may vary as described above about a target player and a target team.

As an example, the second controller 2002 may evaluate the target entity on the basis of a feature index of at least one other sport object stored in the memory 2200. More specifically, the second controller 2002 may compare the feature index of the target entity to a feature index of at least one other sport object stored in the memory 2200 to determine the type of the target entity. Alternatively, the second controller 2002 may predict the ability ranking of the target entity among a plurality of sport teams.

As another example, on the basis of the feature index of the target entity and a feature index of at least one other sport object stored in the memory 2200, the second controller 2002 may compute the comparative advantage of the target entity with respect to other sports objects.

Here, as described above, the feature index may be extracted from data obtained by combining heatmap data of the target team and at least one sport object. That is, the data analysis device 2000 may evaluate the target entity on the basis of the data obtained by combining the heatmap data of the target entity and the other sport object.

In addition to the above-described examples, as described above, the second controller 2002 may analyze sport data of the target entity and evaluate everything that can be provided as an index.

After the step of evaluating the target entity (S7200), the data analysis device 2000 may output a result of the evaluation (S7400). Specifically, the second controller 2002 may output the evaluation result through an output unit separately provided in the data analysis device 2000 and may transmit the evaluation result to an external device through the second communication module 2800.

The step of the data analysis device 2000 evaluating the target entity has been described above in detail.

According to an embodiment, the data analysis device 2000 may provide various services on the basis of the evaluation result. Specifically, the second controller 2002 may receive information of an external network or an external device from the second communication module 2800 and may provide a service corresponding to the evaluation result of the target entity on the basis of the information.

Here, the service provided based on the evaluation result of the target entity may be variously interpreted.

As an example, the service may refer to the provision of information related to the scouting of a player. As another example, the service may refer to the provision of information related to training and/or a match of a professional team. As another example, the service may refer to the provision of information related to training and/or a match of a youth team. As another example, the service may refer to the broadcasting of the evaluation result. As another example, the service may refer to the prediction of a winner of a specific match or provide winning percentage information corresponding to each team through the evaluation result. As another example, the service may refer to the uploading of an evaluation result to an online network. As another example, the service may refer to the provision of the evaluation result in real time.

All methods performed by the elements of the system 100 according to the above-described embodiments may be performed independently or in combination, and a subject that performs the methods may be changed.

The method according to an embodiment may be implemented as program instructions executable by a variety of computers and may be recorded on a computer-readable medium. The computer-readable medium may include program instructions, data files, data structures, and the like alone or in combination. The program instructions recorded on the medium may be designed and configured specifically for an embodiment or may be publicly known and available to those skilled in the field of computer software. Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the computer instructions include not only machine language code generated by a compiler, but also high-level language code executable by a computer using an interpreter or the like. The hardware device may be configured to operate as one or more software modules in order to perform operations of an embodiment and vice versa.

According to the present invention, by extracting a feature index using a unique principal component reflecting the characteristics of a corresponding sport from sport data of an athlete, it is possible to perform an objective and detailed evaluation reflecting the characteristics of the sport on a player.

According to the present invention, by acquiring location data and dynamic data from an athlete and processing the location data and the dynamic data using at least one piece of heatmap data such that the processed data is appropriate for the analysis of a corresponding sport, it is possible to perform an evaluation with high accuracy or reliability on the athlete.

According to the present invention, it is possible to provide an objective evaluation result for a target player on the basis of feature indices of a plurality of players who play the same sport as that performed by the target player.

According to the present invention, by analyzing the characteristics of a sport played by a target player, extracting meaningful data from the sport, and evaluating the target player, it is possible to provide an accurate evaluation result.

Although the present invention has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. A method for evaluating an athlete, the method comprising:
   obtaining, by a controller, a location data of a plurality of sports participants, the location data indicating a location of the plurality of sports participants in a playground during a sport game;
   calculating, by the controller, a reference location data for a specific participant, wherein the reference location data is obtained by using the location data of at least 2 other sports participants playing the same sport game with the specific participant;
   generating, by the controller, a relative location data for the specific participant based on the location data for the specific participant and the reference location data, the relative location data for the specific participant indicating a relative location of the specific participant respect to the reference location data;
   generating, by the controller, a relative heatmap data for the specific participant using the relative location data for the specific participant, wherein the relative heatmap data includes a relative location heatmap of the specific participant, the relative location heatmap reflecting a frequency of a spatial occupancy of the relative location of the specific participant during the sport game thereof;
   calculating, by the controller, a first performance index related to the specific participant based on the relative heatmap data for the specific participant;
   comparing, by the controller, between the first performance index and a second performance index related to other sport player playing the same sport as the specific participant; and
   outputting, by the controller, an evaluation result of the specific participant based on a comparison result of the first performance index and the second performance index.

2. The method according to claim 1,
   wherein the first performance index represents weight values of the relative heatmap data of the specific participant according to principal components of a plurality of relative heatmap data for a plurality of players playing the same sport as the specific participant.

3. The method according to claim 1, wherein the reference location data is an average location of a plurality of sports participants playing a same team as the specific participant during the sport game.

4. The method according to claim 1, wherein the relative location data is obtained by multiplying a predetermined value to the location data for the specific participant.

5. The method according to claim 1, wherein the location data is defined by a 2-dimensional coordinate system including an offence direction value and a transverse direction value which is perpendicular to the offence direction value, and
wherein the relative location data is obtained by multiplied the predetermined value only to the offence direction value or to the transverse direction value.

6. The method according to claim 1, further comprising displaying the relative location heatmap;
wherein the relative location heatmap has a visual indication which reflects an amount of the frequency of the spatial occupancy of the relative location of the specific participant during the sport game.

7. The method according to claim 1, wherein the second performance index is pre-acquired.

8. A device for evaluating an athlete, the device comprising:
a communication module configured to receive a location data of a plurality of sports participants, the location data indicating a location of the plurality of sports participants in a playground during a sport game;
a memory; and
a controller electrically connected to the communication module and the memory, wherein the controller is configured to:
obtaining the location data from the communication module;
calculating a reference location data for a specific participant, wherein the reference location data is obtained by using the location data of at least 2 other sports participants playing the same sport game with the specific participant;
generating a relative location data for the specific participant based on the location data for the specific participant and the reference location data, the relative location data for the specific participant indicating a relative location of the specific participant respect to the reference location data;
generating a relative heatmap data for the specific participant using the relative location data for the specific participant, wherein the relative heatmap data includes a relative location heatmap of the specific participant, the relative location heatmap reflecting a frequency of a spatial occupancy of the relative location of the specific participant during the sport game thereof;
calculating a first performance index related to the specific participant based on the relative heatmap data for the specific participant;
comparing between the first performance index and a second performance index related to other sport player playing the same sport as the specific participant; and
outputting an evaluation result of the specific participant based on a comparison result of the first performance index and the second performance index.

9. The device according to claim 8, wherein the first performance index represents weight values of the relative heatmap data of the specific participant according to principal components of a plurality of relative heatmap data for a plurality of players playing the same sport as the specific participant.

10. The device according to claim 8, wherein the reference location data is an average location of a plurality of sports participants playing the same team as the specific participant during the sport game.

11. The device according to claim 8, wherein the relative location data is obtained by multiplying a predetermined value to the location data for the specific participant.

12. The device according to claim 8, wherein the location data is defined by a 2-dimensional coordinate system including an offence direction value and a transverse direction value which is perpendicular to the offence direction value, and
wherein the relative location data is obtained by multiplied the predetermined value only to the offence direction value or to the transverse direction value.

13. The device according to claim 8, wherein the controller is further configured to display the relative location heatmap; and
wherein the relative location heatmap has a visual indication which reflects an amount of the frequency of the spatial occupancy of the relative location of the specific participant during the sport game.

14. The device according to claim 8, wherein the second performance index is pre-acquired.

* * * * *